(12) United States Patent
Claussen et al.

(10) Patent No.: US 12,128,938 B2
(45) Date of Patent: Oct. 29, 2024

(54) SYSTEM AND METHOD FOR CONTROLLING AN AXLE OF A VEHICLE

(71) Applicant: Transportation IP Holdings, LLC, Norwalk, CT (US)

(72) Inventors: Christopher Claussen, Cedar Rapids, IA (US); Jeffrey D. Kernwein, Cedar Rapids, IA (US); Joseph Gorman, Cedar Rapids, IA (US); David Bradley Pulliam, Lawrence Park, PA (US); Ajith Kuttannair Kumar, Erie, PA (US); Bret Dwayne Worden, Erie, PA (US); Jeremy Thomas McGarry, Erie, PA (US); Kevin Ray Ruybal, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 919 days.

(21) Appl. No.: 16/718,751

(22) Filed: Dec. 18, 2019

(65) Prior Publication Data
US 2020/0122755 A1 Apr. 23, 2020

Related U.S. Application Data

(63) Continuation-in-part of application No. 15/674,768, filed on Aug. 11, 2017, now abandoned, which is a
(Continued)

(51) Int. Cl.
*B61L 15/00* (2006.01)
*B60L 1/00* (2006.01)
(Continued)

(52) U.S. Cl.
CPC .......... *B61L 15/0081* (2013.01); *B60L 1/003* (2013.01); *B60L 3/106* (2013.01); *B60L 13/00* (2013.01);
(Continued)

(58) Field of Classification Search
CPC ............ B60L 2200/26; B60L 2260/44; B60L 2250/12; B60L 2240/70; B60L 2240/622;
(Continued)

(56) References Cited

U.S. PATENT DOCUMENTS 6,148,269 A * 11/2000 Kumar .................... B60T 8/173
180/209
7,478,570 B2 * 1/2009 Mian ........................ B61K 9/12
73/865.9
(Continued)

FOREIGN PATENT DOCUMENTS

EP 2818340 A1 * 12/2014 .......... B60W 10/184
JP 2003344023 A * 12/2003
(Continued)

*Primary Examiner* — Rami Khatib
*Assistant Examiner* — Paul Allen
(74) *Attorney, Agent, or Firm* — K&L Gates LLP

(57) ABSTRACT

A system may include a controller with one or more processors. The controller may determine the wheel size of a wheel of a vehicle during a trip. The one or more processors may communicate a message associated with the wheel size to an off-board device when the wheel size is below a threshold size.

20 Claims, 15 Drawing Sheets

Related U.S. Application Data continuation of application No. 14/963,889, filed on Dec. 9, 2015, now Pat. No. 9,751,542, which is a continuation of application No. 14/169,459, filed on Jan. 31, 2014, now Pat. No. 9,211,809.

(60) Provisional application No. 61/790,477, filed on Mar. 15, 2013.

(51) Int. Cl.
    *B60L 3/10*         (2006.01)
    *B60L 13/00*       (2006.01)
    *B60L 15/20*       (2006.01)
    *B60L 50/51*       (2019.01)
    *B61C 3/00*        (2006.01)

(52) U.S. Cl.
CPC ............ *B60L 15/20* (2013.01); *B60L 15/2009* (2013.01); *B60L 15/2045* (2013.01); *B60L 50/51* (2019.02); *B61C 3/00* (2013.01); *B61L 15/00* (2013.01); *B60L 2200/26* (2013.01); *B60L 2200/36* (2013.01); *B60L 2210/40* (2013.01); *B60L 2220/42* (2013.01); *B60L 2240/12* (2013.01); *B60L 2240/421* (2013.01); *B60L 2240/423* (2013.01); *B60L 2240/461* (2013.01); *B60L 2240/463* (2013.01); *B60L 2240/465* (2013.01); *B60L 2240/622* (2013.01); *B60L 2240/70* (2013.01); *B60L 2250/00* (2013.01); *B60L 2250/12* (2013.01); *B60L 2260/44* (2013.01); *B61L 2201/00* (2013.01); *Y02T 90/16* (2013.01)

(58) Field of Classification Search
CPC ......... B60L 2240/465; B60L 2240/463; B60L 2240/461; B60L 2240/423; B60L 2240/421; B60L 2240/12; B60L 2220/42; B60L 2210/40; B60L 2200/36; B60L 3/0015; B60L 2240/642; B61C 3/00; Y02T 10/64; Y02T 10/70; Y02T 10/72; Y02T 90/16; B61L 15/00; B61L 2201/00; B61L 15/0081; B61K 11/00

See application file for complete search history.

(56) References Cited

U.S. PATENT DOCUMENTS

| | | | |
|---|---|---|---|
| 9,211,809 B2 | 12/2015 | Pulliam et al. | |
| 10,203,306 B2 * | 2/2019 | Mian | G01M 17/10 |
| 2004/0181320 A1 * | 9/2004 | Kane | G01C 22/02 |
| | | | 701/19 |
| 2007/0043486 A1 * | 2/2007 | Moffett | G01M 17/10 |
| | | | 701/31.4 |
| 2007/0279203 A1 * | 12/2007 | Thomas | B60C 23/0472 |
| | | | 340/447 |
| 2009/0234521 A1 * | 9/2009 | Kumar | B60L 58/10 |
| | | | 701/19 |
| 2010/0023190 A1 * | 1/2010 | Kumar | G05B 13/021 |
| | | | 701/20 |
| 2013/0083188 A1 * | 4/2013 | Mian | G01B 11/06 |
| | | | 348/135 |
| 2014/0365046 A1 * | 12/2014 | Madsen | B60L 15/38 |
| | | | 701/19 |
| 2019/0161085 A1 * | 5/2019 | Dudar | B60W 30/18009 |

FOREIGN PATENT DOCUMENTS

| | | | | |
|---|---|---|---|---|
| JP | 2009017736 A | * | 1/2009 | |
| WO | WO-2013026396 A1 | * | 2/2013 | ............ B60C 23/06 |

* cited by examiner

SYSTEM AND METHOD FOR CONTROLLING AN AXLE OF A VEHICLE

CROSS-REFERENCE TO RELATED APPLICATIONS

This application is a continuation-in-part of U.S. patent application Ser. No. 15/674,768, filed 11 Aug. 2017 which is a continuation of U.S. patent application Ser. No. 14/963,889, filed 9 Dec. 2015 and issued as U.S. Pat. No. 9,751,542 on 5 Sep. 2017, which is a continuation of U.S. patent application Ser. No. 14/169,459, filed 31 Jan. 2014 (the "'459 Application") and issued as U.S. Pat. No. 9,211,809 on 15 Dec. 2015, which claims priority to U.S. Provisional Application No. 61/790,477, filed 15 Mar. 2013. The '459 Application is related to U.S. application Ser. No. 14/169,580, filed 31 Jan. 2015. The entire disclosures of the foregoing applications are incorporated herein by reference.

BACKGROUND

Technical Field

This disclosure relates to making determinations related to maintenance without need for manual measurement.

Discussion of Art

Vehicles require maintenance for continued operation. This maintenance may include having oil changed, tires rotated, air filters replaced and the like. By undergoing maintenance, the performance and life of the vehicle may increases while the frequency and/or severity of breakdowns may be reduced.

Certain vehicles undergo maintenance checks to ensure that all systems and components of a vehicle are operating properly. As an example, once a vehicle reaches a final destination, the vehicle may be refueled, recharged, or both before heading out on a new trip. During this down time, maintenance workers may take manual measurements of the systems and components of the rail vehicle to determine if additional maintenance may be required.

One of these measurements may be to determine the wheel size of the wheel of a rail vehicle to determine if the wheel diameter is still within specification. The wheel that engages the rail may be referred to as the rolling round, where the diameter of the wheel is the diameter of the rolling round. Special instruments, such as hand tools, calipers, rulers, may be used by an individual to determine the wheel diameter to determine how much material has been lost during travel.

The process of measuring the wheel diameters may be tedious, time consuming and prone to error. Sometimes an individual needed to make the measurement is unavailable. Additionally, that individual can make human error in the measurement. If the wheel does need to be replaced, at that time, the wheel replacement must be scheduled. This can cause undesired delay, expense and frustration. It may be desirable to have a system and method that differs from those that are currently available.

BRIEF DESCRIPTION

In accordance with one embodiment, a system is provided that includes a controller. The controller may include one or more processors that can determine at least a wheel size of wheel on a vehicle during a trip and communicate a message associated with the wheel size to an off-board device when the wheel size is below a threshold size.

In accordance with one embodiment, a method may include determining the wheel size of a vehicle during a trip and determining if the wheel size is below a first threshold size. A first message associated with the wheel size may be communicated to a first off-board device when the wheel size is below the first threshold size.

In accordance with one embodiment, a system may include a vehicle and at least one sensor on-board the vehicle that determines at least one operational parameter of the vehicle. A controller may be on-board the vehicle and in communication with the at least one sensor. The controller may include one or more processors that can determine the wheel size of a wheel of the vehicle during a trip based on the at least one operational parameter determined and communicate a first message associated with the wheel size to a location for maintenance when the wheel size reaches a first threshold size.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a system and method that use data received and a protocol used by a vehicle controller to determine a diameter of a wheel. In one example, the vehicle may be a rail vehicle that uses a positive train control (PTC) system. Based on PTC protocol information, the diameter of each wheel of the vehicle may be determined. In other example, the wheel diameter may be determined through calculations made during a trip. When the diameter of the wheel indicates replacement may be needed, the controller alerts the operator and sends a signal with a message to an off-board device that the wheel needs replacement. By determining that the wheel needs replacement by using a protocol of the vehicle controller, manual inspections and measurements using equipment may be unnecessary. Additionally, during a trip, determinations may be made before a vehicle even reaches a location where maintenance may occur. Consequently, the message of desired maintenance may be sent before the vehicle reaches a maintenance location, reducing the amount of time the rail vehicle must sit idly in the depot before replacement of the wheel begins.

As used herein, PTC, or PTC protocol, may be considered a control protocol used to provide enhanced safety for rail vehicles during a trip. Specifically, to combat safety issues in rail vehicles, PTC may be used by a vehicle controller to prevent potentially unsafe movement of rail vehicles. Controllers that use PTC may communicate, including wirelessly, with other rail vehicles, off-board devices, command center devices, dispatch devices, etc. to receive information related to other vehicles and safety related to different routes. The PTC protocol may be implemented in software and/or hardware and communicate vehicle parameters with other vehicles, control centers, or the like to prevent the collision of two vehicles. Vehicle parameters include global positioning system GPS information including location, distance and speed; tachometer readings, information stored in a memory such as a trip plan, or the like. The PTC protocol operates the controller to utilize these parameters to determine potential overlaps or collisions of rail vehicle along a route during determined time periods.

Figure 1:
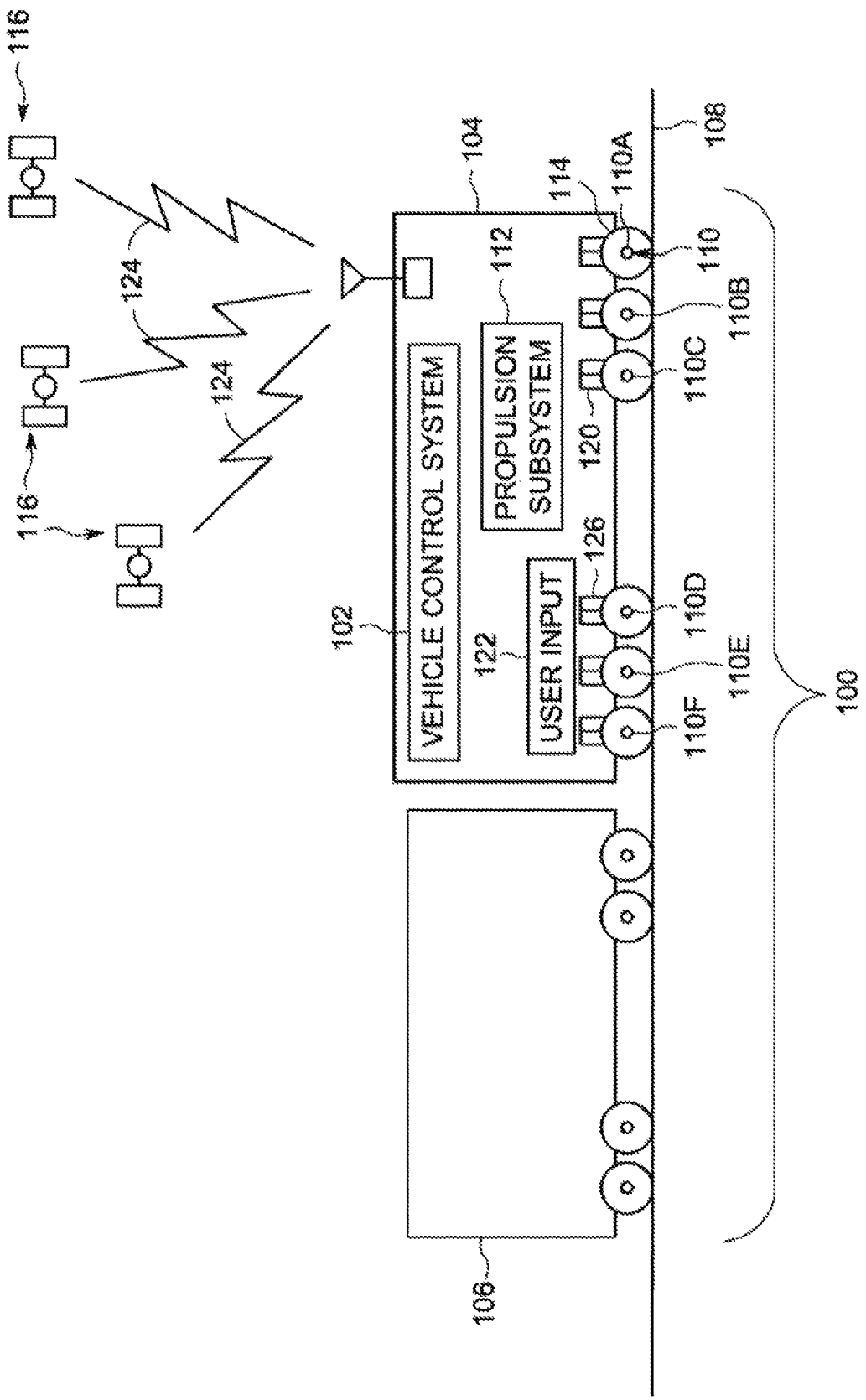
FIG. 1 is a schematic diagram of a vehicle system according to one embodiment.

FIG. 1 is a schematic diagram of a vehicle system 100 having an embodiment of a vehicle control system 102. The vehicle system may be shown as a rail vehicle consist comprising a propulsion-generating vehicle 104 and a non-propulsion generating vehicle 106. The vehicle system may represent a system of vehicles other than rail vehicles, such as other off highway vehicles (e.g., vehicles that may be not permitted or designed for travel on public roadways), mining equipment, automobiles, marine vessels and the like. The propulsion-generating vehicle may represent a locomotive, but also may represent another type of vehicle that generates tractive effort to propel the vehicle system. The non-propulsion generating vehicle may represent cargo cars, passenger cars, or the like (or another type of vehicle that does not generate tractive effort). The vehicle system includes the vehicles connected with each other so that the vehicle system can travel along a route 108 (e.g., a track, road, waterway, or the like).

The propulsion-generating vehicle includes two or more axles 110 (e.g., axles 110A-F) that may be rotated by a propulsion subsystem 112 of the vehicle to generate tractive effort and propel the vehicle along the route. The number and arrangement of the axles may be shown only as an example and may be not intended as limitations on all embodiments described herein. For example, although the first axle 110A may be shown as the front axle along a direction of travel of the vehicle system, alternatively, the first axle may be in another position relative to the other axles. As described below, one embodiment of the propulsion subsystem includes traction motors that may be connected to and rotate the axles and inverters that supply electric energy to the traction motors to power the motors. Wheels may connect to the axles and may be rotated by the axles to propel the vehicle along the route.

The vehicle control system, through the propulsion subsystem, may control the torque applied to the axles and the speeds at which the axles may be rotated. In one aspect, the torque applied to the axles and/or the speeds at which the axles may be rotated by the propulsion subsystem may be individually controlled on an axle-by-axle basis. For example, the torque and/or speed of a first axle may be different than the torque and/or speed of a second axle 110B during the same time period, which may differ from the torque and/or speed of a third axle 110C during the same time period and so on.

The vehicle control system determines vehicle reference speeds that may be used to control the torques applied to the axles and the speeds at which the axles may be rotated by the propulsion subsystem. The vehicle control system receives a selected throttle setting from a user input 122. The selected throttle setting may represent a desired power output or tractive effort that may be to be provided by the vehicle system to travel along the route. The user input may represent a device that may be manually actuated to select the throttle setting, such as a lever, switch, pedal, button, touchscreen, or the like. Additionally or alternatively, the user input may represent a system that designates the selected throttle setting. For example, the user input can include or represent an energy management system that designates throttle settings and/or speeds (from which throttle settings can be determined) of the vehicle system as a function of time and/or distance along the route for a trip. These designated settings and/or speeds may be determined such that operating the vehicle system using the settings and/or speeds results in the vehicle system consuming less fuel and/or producing fewer emissions during a trip over the route than the vehicle system traveling over the same route during the same trip (and arriving at a destination at the same time or within a designated time period) but by traveling according to different settings and/or speeds.

The vehicle control system can determine torques that may be applied to the axles and the speeds at which the axles may be to be rotated by the propulsion subsystem to achieve the power output or tractive effort associated with the selected throttle setting. Optionally, the torque applied to a wheel or axle may be determined based on a vehicle speed, such as a vehicle reference speed (which may be based on and/or determined from the onboard-based input speed and/or the off-board-based input speed). In one embodiment, the torque applied to one or more axles may be determined from and/or based on the off-board-based input speed and not any other vehicle reference speed or other vehicle speed (e.g., the onboard-based input speed), or the torque may be determined from and/or based on the onboard-based input speed and not any other vehicle reference speed or other vehicle speed (e.g., the off-board-based input speed). The torques may be determined based on the selected throttle setting (e.g., with greater torques associated with larger throttle settings and lesser torques associated with smaller throttle settings). The speeds at which the axles may be rotated may be determined from the vehicle reference speeds. For example, the vehicle control system may direct the propulsion subsystem to rotate the axles at speeds that may be based on (e.g., related to via one or more mathematical relationships) one or more vehicle reference speeds to apply the torque associated with the selected throttle setting. In one aspect, the vehicle reference speed determination may be performed down to zero vehicle speed. In such an instance, there would be no minimum speed threshold value on the determination function.

In one aspect, the vehicle control system can direct the propulsion subsystem to rotate an axle at a speed that may be within a designated range of speeds relative to a vehicle reference speed. Although this designated range of speeds may be modified and/or customized depending on a desired outcome, the designated range of speeds may include from about 103% to about 104% of a vehicle reference speed. Alternatively, the designated range of speeds may be a larger range of percentages or fractions of the vehicle reference speed. In another embodiment, the designated range of speeds may include the vehicle reference speed.

The vehicle reference speed that may be used to control the speeds at which the axles may be rotated may differ for different axles of the same vehicle. For example, for at least one axle (or another axle), the vehicle reference speed may be based on an off-board-based input speed. For one or more other axles (or all other axles), the vehicle reference speed may be based on an onboard-based input speed, such as one or more measured wheel speeds and/or a combination of these wheel speeds and the off-board-based input speed.

The vehicle control system can obtain the off-board-based input speed from data signals received from one or more off-board devices 116. These off-board devices can represent or include satellites, wayside devices, cellular towers and/or antennas, wireless network antennas and the like. A position and/or velocity data receiver 118 (such as GPS satellites, wayside devices, wife communications, radio communications, TV communications, cellular communications/towers and the like) may receive position and/or velocity data signals 124 from one or more of the off-board devices. The position and/or velocity data signals may be used by the vehicle control system and/or the position and/or velocity data receiver to calculate the off-board-based input speed. The off-board-based input speed can represent the actual speed of the vehicle system and/or the vehicle as the vehicle system actually travels along the route. As one example, the off-board devices can represent satellites. Additionally or alternatively, the off-board-based input speed may be obtained from one or more other devices disposed remote from the vehicle system other than the satellites. For example, stationary wayside devices disposed alongside the route may communicate position and/or velocity data with the vehicle control system as the vehicle control system travels along the route. This position and/or velocity data may represent the position of the devices and/or other information that can be used to calculate the speed of the vehicle system. The vehicle control system can determine the locations of multiple wayside devices as the vehicle system passes the wayside devices or otherwise moves relative to the wayside devices and determine the vehicle reference speed based on the locations of the wayside devices and the movement of the vehicle system relative to the wayside devices. Additionally or alternatively, the vehicle control system may receive the satellite-based input speed from another off-board location, such as a dispatch facility or center.

Optionally, the off-board-based input speeds may be obtained or derived from at least some data generated or obtained onboard the vehicle system. For example, the position and/or velocity data receiver may include or represent one or more gyroscopes and/or accelerometers that generate data representative of movement of the vehicle system. The position and/or velocity data receiver and/or control system may include a clock, such as an atomic clock, or be in communication with such a clock, to track passage of time relative to a reference time (e.g., the atomic clock). Using the data on the movement of the vehicle system from a known location (e.g., a starting location) and the passage of time from the reference time, the control system may determine current speeds of the vehicle system and use these speeds as off-board-based input speeds.

The vehicle control system can obtain the onboard-based input speeds from one or more sensors that do not receive signals from remote locations (e.g., the off-board devices) to measure the speed of the vehicle system. For example, the vehicle control system may receive measured wheel speeds of the wheels of the vehicle system as the vehicle system travels along the route. The wheel speeds may be measured by speed sensors 120, such as tachometers or other devices that measure the speeds at which the wheels and/or axles rotate. Additionally or alternatively, the onboard-based input speeds may be obtained from another type of sensor that may be disposed onboard the vehicle system and that measures movement of one or more components of the vehicle system to determine the onboard-based input speeds.

For at least one axle (or one or more of axles), the vehicle control system determines the vehicle reference speed that may be used to control the speed at which the first axle may be rotated from a group of input speeds that includes the off-board-based input speed. For example, the vehicle reference speed that may be used to determine the speed at which the first axle may be rotated may be selected or calculated from a group of input speeds that includes the off-board-based input speed and the onboard-based input speeds associated with one or more other axles. As described in more detail below, such a vehicle reference speed may be selected as the input speed in the group that may be faster than one or more other input speeds in the group, or as the fastest input speed in the group, when the vehicle may be braking (e.g., generating braking effort to slow or stop movement of the vehicle and/or vehicle system). The vehicle reference speed for the first axle may be selected as the input speed in the group that may be slower than one or more other input speeds in the group, or as the slowest input speed in the group, when the vehicle may be motoring (e.g., generating tractive effort to propel the vehicle and/or vehicle system). A faster input speed may be used as the vehicle reference speed when the vehicle may be braking so that the vehicle reference speed may be less likely to be based on wheel slip, since slower rotating wheels (e.g., onboard-based input speed) during braking may be more likely to be the result of the wheels slipping relative to the route during braking than faster moving wheels. A slower input speed may be used as the vehicle reference speed when the vehicle may be motoring so that the vehicle reference speed may be less likely to be based on wheel slip, since faster rotating wheels (e.g., onboard-based input speed) during motoring may be more likely to be the result of the wheels slipping relative to the route 108 during motoring than slower moving wheels.

For one or more other axles, the vehicle control system can determine the vehicle reference speed that may be used to control the speeds at which the other axles may be rotated from a group of onboard-based input speeds. For example, the vehicle reference speed for the axles may be selected as the median or average of the onboard-based input speeds in this group of input speeds. Alternatively, another calculation or technique may be used to select the vehicle reference speed from this group of onboard-based input speeds.

The vehicle reference speeds may be used by the vehicle control system to determine the speeds at which the axles may be rotated by motors of the propulsion subsystem. For example, to generate the torque associated with a selected throttle setting, the propulsion subsystem may be directed by the vehicle control system to rotate the axles at speeds that may be within the designated range of speeds relative to the vehicle reference speed. As one example, the designated range of speeds for an axle can include a range of speeds of a vehicle reference speed, such as x to y percent of the vehicle reference speed associated with the axle. As described above, x can represent 103% and y can represent 104%, although other amounts may be used for x or y. Therefore, for the first axle associated with the satellite-based input speed, the propulsion subsystem may be directed to rotate the axle 110A at a speed that may be within x to y percent of the satellite-based input speed. For the axles, the propulsion subsystem may be directed to rotate the axles at speeds that may be within x to y percent of the vehicle reference speed selected from the group of reference speeds, as described above.

Figure 2:
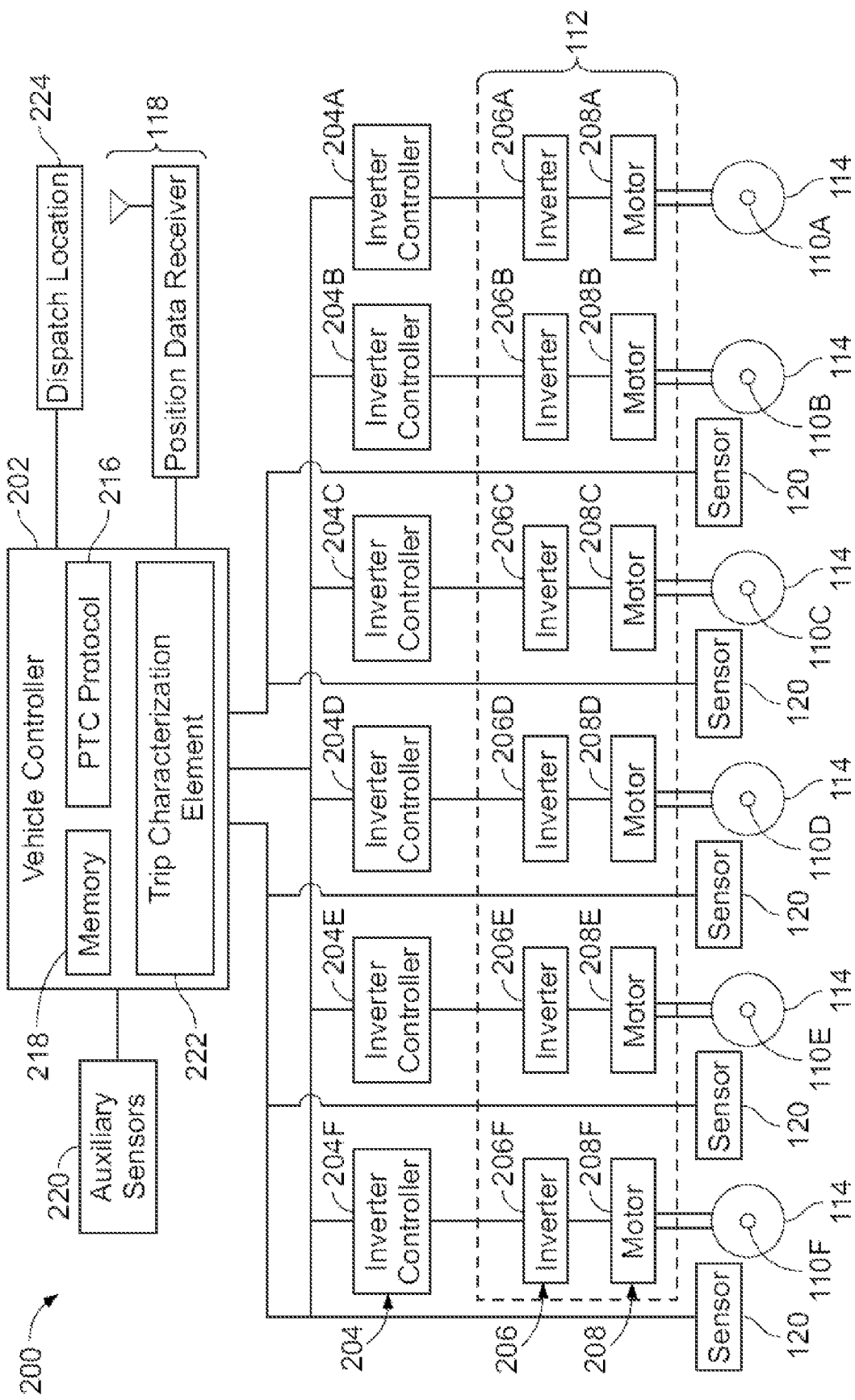
FIG. 2 is a schematic diagram of a vehicle control system according to one embodiment.

FIG. 2 is a schematic diagram of an embodiment of a vehicle control system 200. The vehicle control system may represent the vehicle control system shown in FIG. 1. The vehicle control system may include a vehicle controller 202 that may include or represent hardware circuitry or circuits that include and/or are connected to one or more processors 203, microcontrollers, or other logic-based devices. The vehicle controller may obtain the input speeds and determines the vehicle reference speeds described above. For example, the vehicle controller may communicate with the position and/or velocity data receiver (FIG. 1) to receive the position and/or velocity data transmitted by the off-board devices (shown in FIG. 1). From the data received by the position and/or velocity data receiver, the vehicle controller can calculate the off-board-based input speed of the vehicle (shown in FIG. 1).

The vehicle controller 202 may include a wireless communication system 214 that allows wireless communications between vehicles in the vehicle system and/or with off-board locations, such as the off-board (dispatch) location. The communication system may include a receiver and a transmitter, or a transceiver that performs both receiving and transmitting functions. The communication system may include an antenna and associated circuitry. In this manner, the control system may communicate with other vehicles, control stations, etc. to send and received information and parameters related to the vehicle and other vehicle that may at least partially shape the route.

In an embodiment, the vehicle controller may include one or more processors that implement a PTC protocol 216. The PTC protocol may obtain and communicate information about the vehicle system and other vehicles traveling along a similar route. The PTC protocol may be implemented by both software and hardware components.

The vehicle controller optionally may also include a controller memory 218, which may be an electronic, computer-readable storage device or medium. The controller memory may be housed in the housing of the controller, or alternatively may be on a separate device that may be communicatively coupled to the controller and the one or more processors therein. By "communicatively coupled," it may be meant that two devices, systems, subsystems, assemblies, modules, components and the like, are joined by one or more wired or wireless communication links, such as by one or more conductive (e.g., copper) wires, cables, or buses; wireless networks; fiber optic cables and the like. The controller memory can include a tangible, non-transitory computer-readable storage medium that stores data on a temporary or permanent basis for use by the one or more processors. The memory may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs and the like. In an example, the memory may store information that may be used by the PTC protocol, including a starting location, route maps, trip plans, ending location, wheel diameters at starting location, etc.

The vehicle control system includes the speed sensors (FIG. 1) that may be operatively connected with the wheels and/or axles of the vehicle. The speed sensors can include or represent tachometers that may be disposed relatively close to the wheels and/or axles, or that may be mechanically connected with the wheels and/or axles, so that the speed sensors can measure the speed at which the wheels and/or axles rotate during movement of the vehicle.

Alternatively, one or more auxiliary sensors 220 may be provided. The one or more auxiliary sensors may include a global positioning system (GPS), a tachometer, compass, etc. Based on the information within the memory and information determined by the one or more sensors, one or more processors of the vehicle controller may determine the diameter of the wheel. The determinations may be made by algorithms, look-up tables, or the like.

In particular, by knowing how far the vehicle has traveled by using GPS information compared to the starting location and route maps, combined with knowing the rotations of the axles as determined by the tachometer, one can determine the diameter of the wheel. Specifically, by also knowing the starting diameter, an expected distance based on the tachometer and the wheel not changing size may be compared to the actual distance. From this distance a determination may be made as to the actual diameter of the wheel. Similarly, based on the wear experienced by the wheel during the trip, the one or more processors may calculate or predict the diameter of the wheel when arriving at a destination. These destinations may be, for example, a repair depot, a switching yard, or a stop.

Several inverter controllers 204 (e.g., inverter controllers 204A-F) of the vehicle control system determine the speeds at which to rotate the respective axles. The inverter controllers can include or represent one or more processors, microcontrollers, or other logic-based devices. The inverter controllers can be communicatively coupled with a propulsion subsystem 210 to control the speeds at which the axles may be rotated. The propulsion subsystem may be similar to the propulsion subsystem shown in FIG. 1. The inverter controllers may connect with inverters 206 of the propulsion subsystem. The inverters control the supply of electric current to motors 208 (e.g., motors 208A-F) of the propulsion subsystem. The motors may be operatively connected with the axles, such as by being directly coupled with the axles or interconnected with the axles by one or more gears, pinions and the like. The inverters control the speed at which the motors rotate the axles by controlling the electric current supplied to the motors, such as by controlling a frequency of alternating current that may be supplied to the motors.

The inverter controllers receive the torques that may be to be applied to the axles by the inverters and the vehicle reference speed(s) from the vehicle controller. As described above, the vehicle controller can identify a first vehicle reference speed for the first axle (or another axle) from a group of input speeds that includes the off-board-based input speed and one or more of the onboard-based input speeds. The vehicle controller can identify a second vehicle reference speed (which may differ from the first vehicle reference speed or be the same as the first vehicle reference speed) for the axles from a group of input speeds that includes the onboard-based input speeds, but that may not include the off-board-based input speed.

The inverter controllers determine the speeds at which to rotate the axles based on the received vehicle reference speeds for the respective axles. For example, the inverter controllers can direct the inverters to supply current to the motors that causes the motors to rotate the axles at speeds that may be within a designated range of the vehicle reference speed for the respective axle. A first inverter controller 204A can direct a first inverter 206A to supply a first motor 208A with current that causes the first motor to rotate the first axle at a speed that may be within a designated range (e.g., 103 to 104%) of the vehicle reference speed for the first axle and the other inverter controllers 204B-F can direct the respective other inverters 206B-F to supply current to the respective other motors 208B-F that causes the other motors to rotate the other respective axles at speeds that may be within the designated range of the vehicle reference speed associated with the axles.

The vehicle control system further may include a trip characterization element 222 that provides information and data for use by the PTC protocol. The trip characterization element may be configured to provide information about the trip of the vehicle system along the route. The trip information may include route characteristics, designated locations, designated stopping locations, schedule times, meet-up events, directions along the route and the like. For example, the designated route characteristics may include grade, elevation slow warnings, environmental conditions (e.g., rain and snow) and curvature information. The designated locations may include the locations of wayside devices, passing loops, re-fueling stations, passenger, crew and/or cargo changing stations and the starting and destination locations for the trip. At least some of the designated locations may be designated stopping locations where the vehicle system may be scheduled to come to a complete stop for a period of time. For example, a passenger changing station may be a designated stopping location, while a wayside device may be a designated location that is not a stopping location.

In an alternative embodiment, at least some of the components of the vehicle control system may be located off-board from the vehicle system, such as at a dispatch location 224. The remote or off-board components of the control system may communicate with the vehicle system (and with components of the control system disposed thereon).

Figure 3:
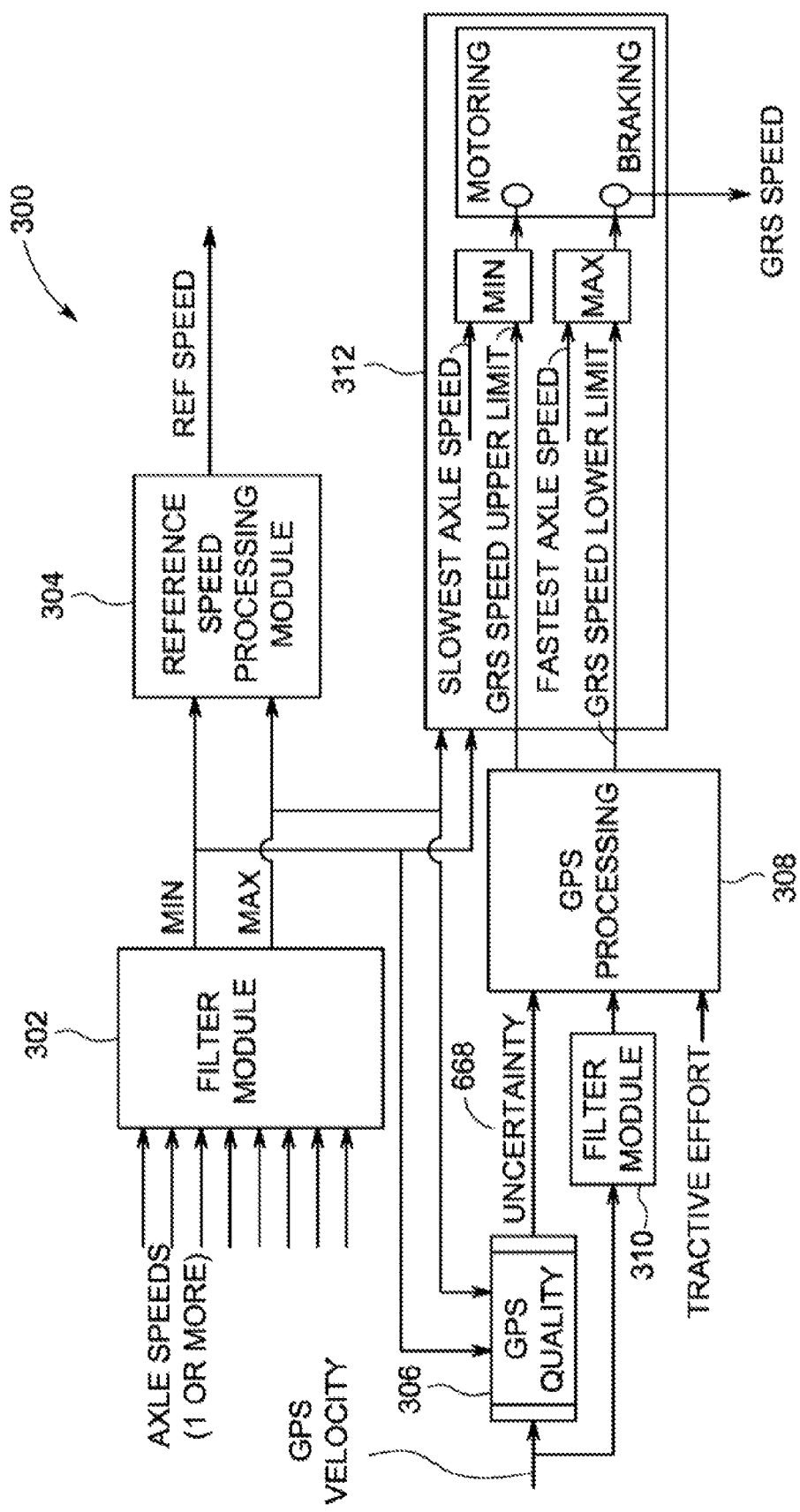
FIG. 3 a schematic of a vehicle controller according to one embodiment.

FIG. 3 illustrates an embodiment of a vehicle controller 300. The vehicle controller may represent the vehicle controller shown in FIG. 2. The vehicle controller includes several modules that represent hardware and/or software used to perform the functions of the vehicle controller described herein. The modules may represent one or more circuits or circuitry that includes and/or may be connected to one or more processors, controllers, microcontrollers, circuitry and/or other hardware and/or associated software that directs the processors, controllers, microcontrollers, circuitry and/or other hardware to perform the functions and operations described herein. Additionally or alternatively, the modules may represent one or more tangible and non-transitory computer readable media that stores one or more sets of instructions for directing the operations of one or more processors, controllers, or other logic-based devices.

A filter module 302 receives input speeds ("Axle Speeds" in FIG. 3) associated with the axles (shown in FIG. 1). For example, the filter module can receive the onboard-based input speed associated with the axles. The filter module examines these input speeds and identifies a slow input speed ("Min" in FIG. 3) and/or a fast input speed ("Max") from this group of input speeds. The slow reference speed may be slower than one or more other onboard-based input speeds, or that may be the slowest input speed of the onboard-based input speeds received by the filter module. The fast input speed may be faster than one or more other onboard-based input speeds, or that may be the fastest input speed of the input speeds received by the filter module.

In the illustrated embodiment, the filter module communicates the fast and slow onboard-based input speeds to a reference speed processing module 304. The reference speed processing module selects one or more of these input speeds communicated from the filter module for sending to the inverter controllers (shown in FIG. 2) associated with the axles. For example, the reference speed processing module may select the fastest onboard-based input speed, the slowest onboard-based input speed, the average onboard-based input speed, the median onboard-based input speed, or another onboard-based input speed as a vehicle reference speed for the axles. The reference speed processing module can communicate this onboard-based vehicle reference speed ("Ref Speed" in FIG. 3) that may be selected from those onboard-based input speeds communicated from the filter module to the inverter controllers (FIG. 2) that control the speeds at which the motors (FIG. 2) rotate the axles that may be not associated with the off-board-based input speed (e.g., the axles or another set of axles).

To account for potential inaccuracies in the off-board-based input speed, the vehicle control system may determine an uncertainty parameter of the off-board-based input speed. The uncertainty parameter may be indicative of inaccuracy or potential inaccuracy of the actual speed of the vehicle system as represented by the off-board-based input speed. Larger uncertainty parameters can indicate that a difference between the off-board-based input speed and the actual speed of the vehicle may be larger than for smaller uncertainty parameters. An off-board-based input speed quality module 306 ("GPS Quality" in FIG. 3) can determine this uncertainty parameter. In one aspect, the quality module 306 uses both the off-board-based input speed ("GPS Velocity" in FIG. 3), or data signals from the position and/or velocity data receiver (shown in FIG. 1) and vehicle-based information to determine the uncertainty parameter.

Figure 5:
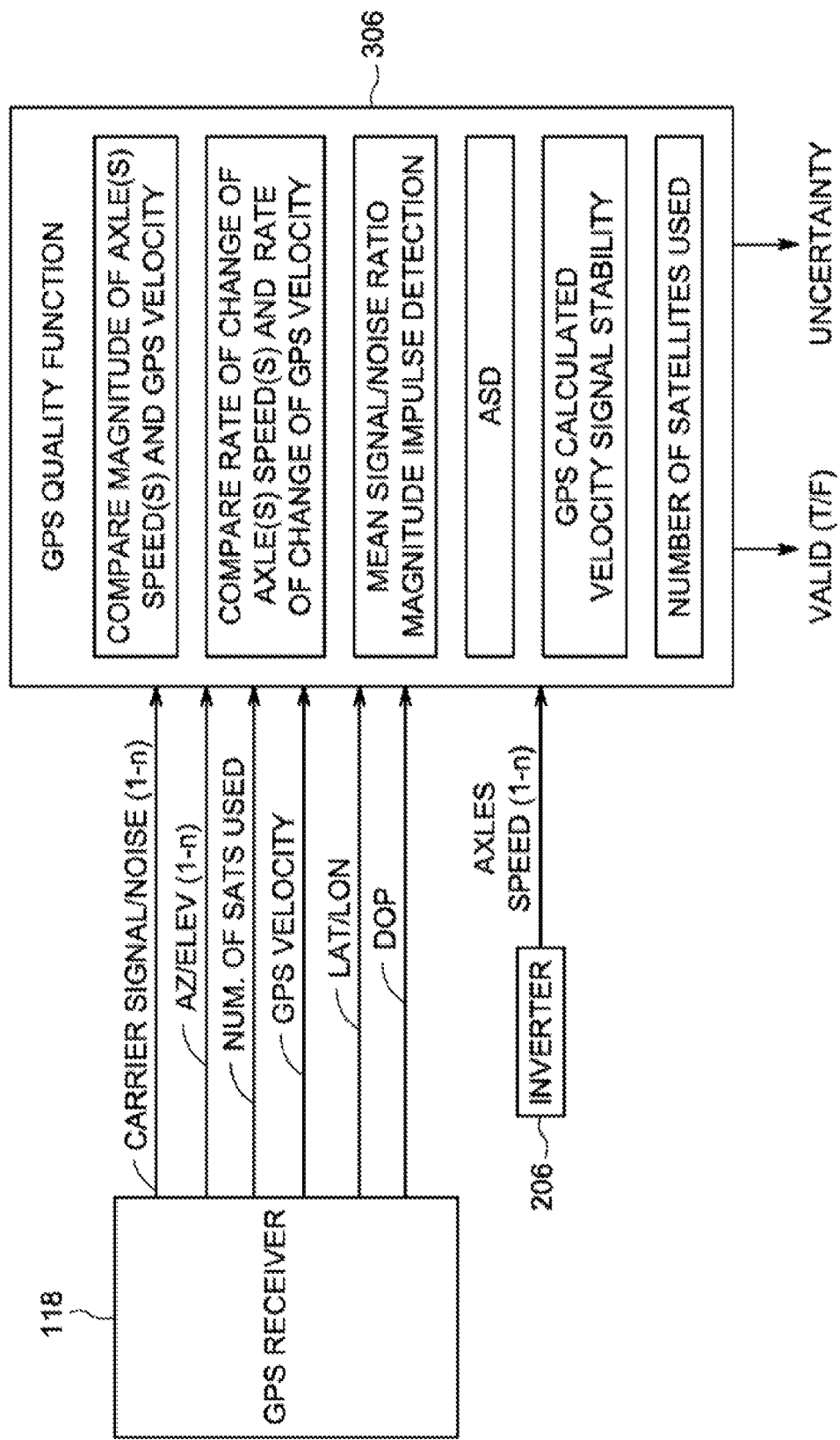
FIG. 5 is a schematic diagram of one example of a quality module shown in FIG. 3 according to one embodiment.

FIG. 5 illustrates a schematic diagram of one example of the quality module shown in FIG. 3. The quality module receives input data from the position and/or velocity data receiver ("GPS Receiver" in FIG. 3, although the position and/or velocity data receiver may represent a device other than a GPS receiver) and from one or more of the inverters of the vehicle (shown in FIG. 2). The input data that may be provided by and/or received from the position and/or velocity data receiver includes a carrier signal to noise ratio ("Carrier signal/noise (1–n)" in FIG. 5), one or more position measurements of the vehicle system (e.g., an azimuth measurement, an elevation measurement, a latitude measurement, a longitude measurement, or the like; shown as "Az/Elev (1–n)" and "Lat/Lon" in FIG. 5), a number of off-board devices from which input data signals may be received by the position and/or velocity data receiver ("Num. of Sats Used" in FIG. 5), a dilution of precision or geometric dilution of precision measurement ("DOP" in FIG. 5) and the like. Optionally, the input data provided by and/or received from the position and/or velocity data receiver may include less than this information, additional information, or different information. The input data that may be provided by and/or received from one of the inverters includes speeds at which the axles may be rotated (shown as "Axle Speed (1–n)" in FIG. 5). Optionally, this input data may be provided by and/or received from one or more of the inverter controllers.

The quality module can apply a quality function (shown as "GPS Quality function" in FIG. 5) using some or all of the input data described above to determine an uncertainty parameter (shown as "Uncertainty" in FIG. 5). In an embodiment, the quality function involves comparing the input data to a cascade of different thresholds to derive the uncertainty parameter and/or position and/or velocity data representative of the location of the position and/or velocity data receiver (e.g., GPS or other coordinates, represented as "Valid (T/F)" in FIG. 5). The uncertainty parameter and/or position and/or velocity data may be output by the quality module, such as by communicating this information to the vehicle controller (shown in FIG. 2).

Figure 6:
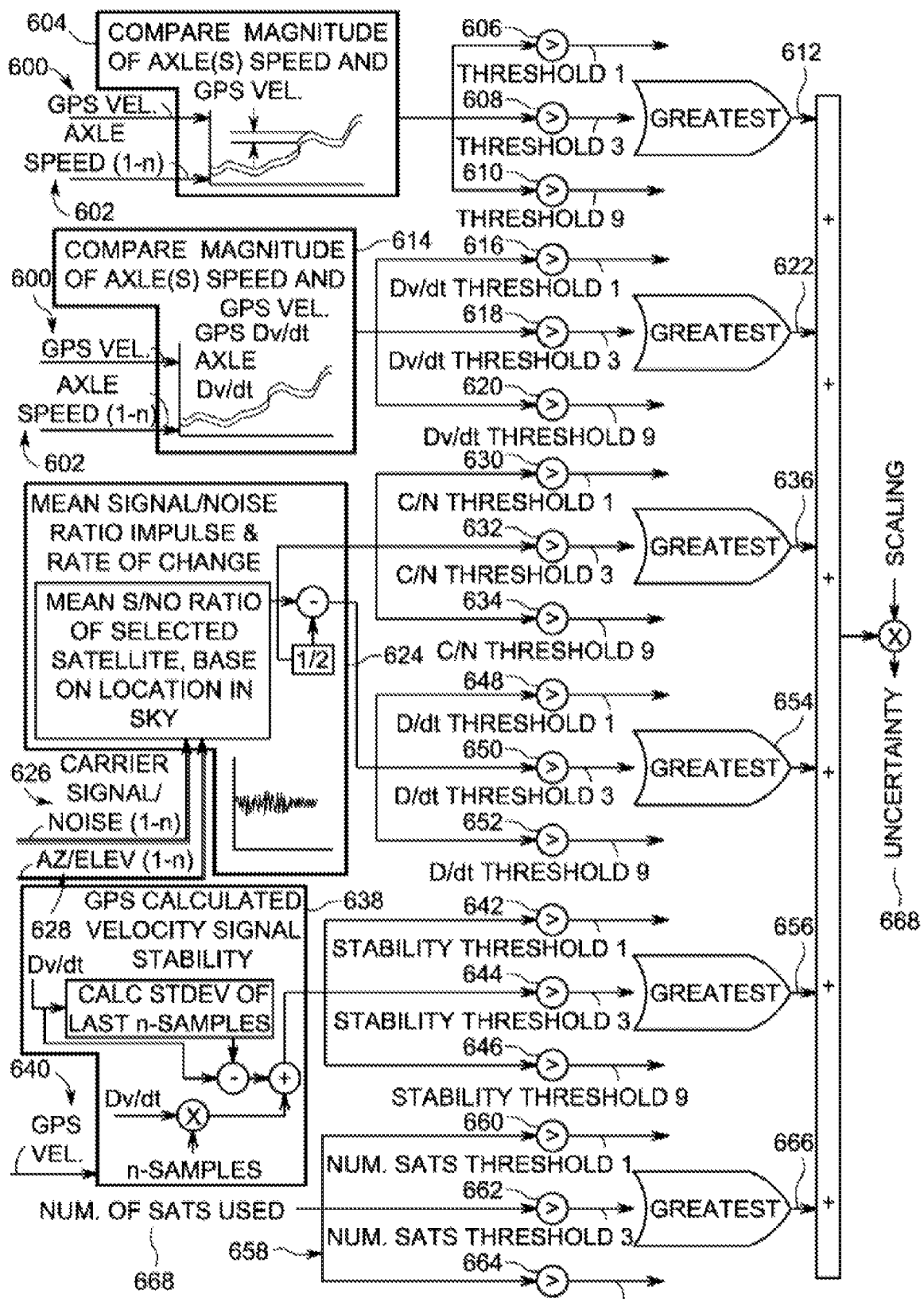
FIG. 6 is a schematic diagram of an application of a quality function according to one embodiment.

With continued reference to the quality module illustrated in FIG. 5, FIG. 6 illustrates a schematic diagram of one example of application of the quality function used by the quality module to determine the uncertainty parameter. The quality module can examine a number of factors in determining the uncertainty parameter of location data. In an embodiment, one or more of these factors may be based on data or information provided by a source other than the position and/or velocity data receiver. For example, input speeds representative of speeds at which the axles (shown in FIG. 1) rotate may be used. The factors used by the quality module to determine the uncertainty parameter can include, but may be not limited to or require the use of all of, a comparison of the magnitude of measured axle speeds ("Axle(s) Speed(s)" in FIG. 5; also referred to as onboard-based input speeds) with a velocity based on position and/or velocity data received by the position and/or velocity data receiver ("GPS Vel" in FIG. 5; also referred to as an off-board-based input speed), a comparison of a rate of change in the onboard-based input speeds with a rate of change in the off-board-based input speeds, a mean or average signal-to-noise ratio of the carrier signal received by the position and/or velocity data receiver, a magnitude of the carrier signal received by the position and/or velocity data receiver, the existence or detection of any signals or other factors that may negatively impact the signals received by the position and/or velocity data receiver (e.g., solar flares, wireless interference, buildings, trees, cloud coverage and the like; shown as "Impulse Detection" in FIG. 5), a stability or variance in the off-board-based input speed (e.g., a deviation, variance, or other statistical analysis of how much the off-board-based input speed changes or varies with respect to time due to variances or instability in the input data; shown as "GPS Calculated Velocity Signal Stability" in FIG. 5), a number of off-board devices (shown in FIG. 1) from which signals used to determine the position and/or velocity data may be received and the like. Additional or other factors may be used.

Application of the quality function to these factors involves comparing some of the factors with each other, comparing the factors (and/or a comparison of the factors) to one or more thresholds and/or summing the results of these comparisons to derive the uncertainty signal. In an embodiment, a first comparison 604 that may be performed by the quality module to determine the uncertainty parameter involves comparing an off-board-based input speed 600 and one or more onboard-based input speeds 602. The quality module compares these input speeds to determine a difference between the input speeds. This difference may be compared to one or more thresholds. In the illustrated example, the difference in input speeds may be compared to a plurality of thresholds. In the illustrated embodiment, there are three thresholds 606, 608, 610. The third threshold may be larger than the second threshold and the second threshold may be larger than the first threshold. If the difference between the input speeds exceed one or more of these thresholds, then a weighted influence 612 may be determined.

This weighted influence can be combined with one or more other weighted influences (described below) to calculate the uncertainty parameter that may be output by the quality module. Different weighted influences may be determined based on which of the thresholds may be exceeded by the difference in the input speeds. In the illustrated example, if the first threshold may be exceeded by the difference between the input speeds and the second and third thresholds may be not exceeded by this difference, then the weighted influence that may be determined may be assigned a smaller value (e.g., one or another value) than if this difference exceeded the second and/or third threshold. If the first and second thresholds may be exceeded by the difference between the input speeds but the third threshold may be not exceeded by this difference, then the weighted influence that may be determined may be assigned a larger value (e.g., three or another value) than if this difference exceeded the third threshold. If the first, second and third thresholds may be exceeded by the difference between the input speeds, then the weighted influence that may be determined may be assigned a larger value (e.g., nine or another value). In one aspect, the weighted influence may have a smaller, smallest, or no value (e.g., value of zero) if the difference in the input speeds does not exceed any of the thresholds.

A second comparison 614 that may be performed by the quality module to determine the uncertainty parameter involves another comparison of the off-board-based input speed and one or more onboard-based input speed. The quality module compares these input speeds to determine a difference in the rate of changes in the input speeds. For example, the quality module may determine a first rate of change in the off-board-based input speed (shown as "GPS Dv/dt" in FIG. 6) and determine a second rate of change in the onboard-based input speed (shown as "Axle Dv/dt" in FIG. 6). The quality module may compare these rates of change with each other to determine a difference between the rates of change. This difference may be compared to one or more thresholds. In the illustrated example, the difference in the rates of change in the input speeds may be compared to three thresholds 616, 618, 620. Optionally, a different number of thresholds may be used. The third threshold may be larger than the second threshold and the second threshold may be larger than the first threshold. If the difference between the rates of change in the input speeds exceeds one or more of these thresholds, then a weighted influence 622 may be determined.

As described above, this weighted influence can be combined with one or more other weighted influences to calculate the uncertainty parameter that may be output by the quality module. Similar to as described above, different weighted influences may be determined based on which of the thresholds may be exceeded by the difference in the rates of change in the input speeds. In the illustrated example (and similar to as described above), if the first threshold may be exceeded, then the weighted influence that may be determined may be assigned a smaller value (e.g., one or another value). If the first and second thresholds may be exceeded, then the weighted influence that may be determined may be assigned a larger value (e.g., three or another value). If the first, second and third thresholds may be exceeded, then the weighted influence that may be determined may be assigned a larger value (e.g., nine or another value). In one aspect, the weighted influence may have a smaller, smallest, or no value (e.g., value of zero) if the difference does not exceed any of the thresholds.

A third comparison 624 that may be performed by the quality module to determine the uncertainty parameter involves a comparison of a carrier signal-to-noise ratio 626, an azimuth measurement and an elevation measurement (collectively referred to by 628 in FIG. 6). C/N represents Carrier Signal/Noise ratio (similar to stated previously). And the Magnitude of C/N may be compared to thresholds. D/dt may be the C/N d/dt, or the change in C/N over time (Impulse). The C/N d/dt may be then compared to thresholds. The quality module may compare the C/N to one or more thresholds and the d/dt to one or more thresholds. In the illustrated example, the C/N may be compared to three thresholds 630, 632, 634 and the d/dt may be compared to three thresholds 648, 650, 652. Optionally, a different number of thresholds may be used.

With respect to the thresholds, the third threshold may be larger than the second threshold and the second threshold may be larger than the first threshold. If the C/N exceeds one or more of these thresholds, then a weighted influence 636 may be determined. As described above, this weighted influence can be combined with one or more other weighted influences to calculate the uncertainty parameter that may be output by the quality module. Similar to as described above, different weighted influences may be determined based on which of the thresholds may be exceeded by the C/N, such as values of one, three and nine. Alternatively, one or more other values may be used. In one aspect, the weighted influence may have a smaller, smallest, or no value (e.g., value of zero) if the C/N does not exceed any of the thresholds.

With respect to the thresholds, the third threshold may be larger than the second threshold and the second threshold may be larger than the first threshold. If the d/dt exceeds one or more of these thresholds, then a weighted influence 654 may be determined. As described above, this weighted influence can be combined with one or more other weighted influences to calculate the uncertainty parameter that may be output by the quality module. Similar to as described above, different weighted influences may be determined based on which of the thresholds may be exceeded by the d/dt, such as values of one, three and nine, respectively. Alternatively, one or more other values may be used. In one aspect, the weighted influence may have a smaller, smallest, or no value (e.g., value of zero) if the d/dt does not exceed any of the thresholds.

A fourth comparison 638 that may be performed by the quality module to determine the uncertainty parameter involves an examination and comparison of the stability or variance 640 in the off-board-based input speed (e.g., a deviation, variance, or other statistical analysis of how much the off-board-based input speed changes or varies with respect to time due to variances or instability in the input data) with one or more thresholds 642, 644, 646. A stability quantity can be calculated to represent this deviation, variance, or other statistical analysis. For example, for a vehicle, a potential or calculated acceleration of the vehicle can be calculated from a mass of the vehicle and potential or directed propulsion forces generated by the vehicle. This potential or calculated acceleration can be used to derive a velocity of the vehicle as an expected velocity. The stability quantity can represent how close or far the expected velocity and the off-board-based input speed are with each other. For example, if the expected velocity may be slower or faster than the off-board-based input speed, then the stability may be calculated as being a relatively small number. On the other hand, if the expected velocity may be closer to the off-board-based input speed, then the stability may be calculated as a larger number. For a given vehicle and based on the vehicle mass and potential propulsion forces (e.g., from traction motors or drive shafts), the control system calculates the possible acceleration that could occur at a moment in time. Knowing the possible/potential/expected value of Velocity, if GPS Velocity input changes such that do not follow the expected physics model outcome, then GPS Velocity signal may be detected as "unstable". Standard Deviation may be just one way to estimate the expected and then compare the standard deviation to the change in Velocity (acceleration/deceleration). The quality module 306 may compare this stability to one or more thresholds. In the illustrated example, the stability may be compared to three thresholds. Optionally, a different number of thresholds may be used. The third threshold may be larger than the second threshold 644 and the second threshold may be larger than the first threshold. If the stability exceeds one or more of these thresholds, then a weighted influence 656 may be determined.

As described above, this weighted influence can be combined with one or more other weighted influences to calculate the uncertainty parameter that may be output by the quality module. Similar to as described above, different weighted influences may be determined based on which of the thresholds may be exceeded by the stability, such as values of one, three and nine, respectively. Alternatively, one or more other values may be used. In one aspect, the weighted influence may have a smaller, smallest, or no value (e.g., value of zero) if the stability does not exceed any of the thresholds.

A fifth comparison 658 that may be performed by the quality module to determine the uncertainty parameter involves a comparison of a number of off-board devices from which data signals were received by the position and/or velocity data receiver (shown as "Num. of Sats Used" in FIG. 6 and referred to as "number 668" in FIG. 6) with one or more thresholds 660, 662, 664. In the illustrated example, this number 668 of off-board devices 116 may be compared to three thresholds. Optionally, a different number of thresholds may be used. In contrast to the other sets of thresholds, the third threshold may be smaller than the second threshold and the second threshold may be smaller than the first threshold. If the number of off-board devices from which data signals were received may be smaller or larger than one or more of these thresholds, then a weighted influence may be determined. For example, if this number may be greater than the first threshold, then a smaller value (e.g., a value of one or another value) may be output as the weighted influence. If this number may be less than the first threshold but greater than the second threshold, then a larger value (e.g., a value of three or another value) may be output as the weighted influence. If this number may be less than the second threshold but larger than the third threshold, then a larger value (e.g., a value of nine or another value) may be output as the weighted influence. In one aspect, if this number may be smaller than the third threshold, then the weighted influence may be output with an even larger value.

One or more, or all, of the weighted influences may be used to determine the uncertainty parameter 668 that may be output from the quality module. In an embodiment, the weighted influences may be combined (e.g., by summing the influences). The combined influences may be scaled, such as by multiplying the combined influences by a number that may be less than or greater than one, to produce the uncertainty parameter. The uncertainty parameter that may be produced can represent a range of speeds above and/or below the off-board-based input speed. For example, if the off-board-based input speed may be 60 kilometers per hour and the uncertainty parameter may be 3 kilometers per hour, then the uncertainty parameter can indicate that the actual, true speed of the vehicle system may be between 57 and 63 kilometers per hour.

Returning to the description of the vehicle controller shown in FIG. 3, the uncertainty parameter can be communicated from the quality module to an off-board-based input speed processing module 308, otherwise referred to as a GPS reference speed processing module ("GRS Processing" in FIG. 3). The off-board-based input speed (or data signals received from the satellites to enable the off-board-based input speed to be calculated) also may be communicated to another filter module. The filter module may filter out one or more of the off-board-based input speeds, such as by only communicating slower or the slowest off-board-based input speeds that may be received over a given time period. The filter module can communicate the filtered off-board-based input speeds to the processing module. The processing module also may receive the tractive effort supplied by the propulsion subsystem (shown in FIGS. 1 and 2) and/or that may be designated by the selected throttle setting received from the user input (shown in FIG. 1). The uncertainty parameter may be in units of velocity, such as kilometers or miles per hour.

The processing module may examine the uncertainty parameter, the filtered off-board-based input speed(s), one or more onboard-based input speeds and/or the tractive effort and calculate an estimated velocity of the vehicle. The estimated velocity may be first order estimate, or an estimate of a first magnitude of the actual speed of the vehicle. The estimated velocity can be based on recent acceleration of the vehicle and/or vehicle system (as determined from the filtered off-board-based input speeds), inertia of the vehicle system and/or the tractive effort of the vehicle and/or vehicle system (e.g., where more than one propulsion-generating vehicle may be included in the vehicle system).

In one aspect, the processing module 308 determines if one or more of the speed sensors (shown in FIG. 1) provide onboard-based input speeds that fall within the range of speeds represented by the off-board-based input speed and the uncertainty parameter. For example, if the off-board-based input speed and the uncertainty parameter represent a range of speeds of 65 kilometers to 75 kilometers, then the processing module can determine if any of the onboard-based input speeds may be within 65 to 75 kilometers per hour. Any such onboard-based input speeds may be identified and used to influence (e.g., modify) the off-board-based input speed.

As one example, if the off-board-based input speed and the uncertainty parameter 668 represent a range of speeds of 65 kilometers per hour to 75 kilometers per hour and the off-board-based input speed indicates a speed of 70 kilometers per hour, then the processing module 308 may determine if any onboard-based input speeds may be within 65 kilometers per hour to 75 kilometers per hour. If one or more onboard-based input speeds may be within this range (e.g., 68 kilometers per hour), then the processing module may modify (e.g., reduce) the off-board-based input speed and/or future off-board-based input speeds. The off-board-based input speeds may be modified such that the off-board-based input speeds may be closer or equivalent to the onboard-based input speeds that fall within the range of the uncertainty parameter.

The processing module can combine the estimated velocity with the uncertainty parameter to determine an upper limit on the speed of the vehicle (e.g., "GRS Speed Upper Limit" in FIG. 3) and a lower limit on the speed of the vehicle (e.g., "GRS Speed Lower Limit" in FIG. 3). For example, the upper limit may be calculated as a sum of the estimated velocity of the vehicle or vehicle system and the uncertainty parameter. The lower limit may be calculated as a difference between the estimated velocity and the uncertainty parameter, such as the uncertainty parameter subtracted from the estimated velocity.

An output module 312 receives the upper limit and the lower limit from the processing module and receives the slow onboard-based input speed and the fast onboard-based input speed from the filter module. For example, the output module can receive the outer limits on the off-board-based input speed (as represented by the upper limit and lower limits on the off-board-based input speed received from the processing module) and receive the slower or slowest onboard-based input speed ("Slowest Axle Speed" in FIG. 3) and the faster or fastest onboard-based input speed from the filter module ("Fastest Axle Speed" in FIG. 3).

The output module can monitor the tractive and/or braking efforts provided by the propulsion subsystem to determine if the vehicle may be motoring or braking and to select the vehicle reference speed for the first axle based on this determination. If the vehicle may be motoring, the output module identifies a smaller speed or the smallest speed of the speeds in a group that includes the slow speed of the onboard-based input speeds received from the filter module (e.g., the Slowest Axle Speed) and the upper limit on the off-board-based input speed received from the processing module (e.g., the GRS Speed Upper Limit). The speed that may be identified ("GRS Speed" in FIG. 3) can be used as a vehicle reference speed for the first axle to control the speed at which the axle associated with the off-board-based input speed may be rotated. For example, the identified speed can be used to control the speed of the first axle during motoring.

If the vehicle may be braking, the output module identifies a faster speed or the fastest speed of the speeds in a group that includes the fast speed of the onboard-based input speeds received from the filter module (e.g., the Fastest Axle Speed) and the lower limit on the off-board-based input speed received from the processing module (e.g., the GRS Speed Lower Limit). The speed that may be identified ("GRS Speed" in FIG. 3) can be used as a vehicle reference speed for the first axle to control the speed at which the axle associated with the off-board-based input speed may be rotated. For example, the identified speed can be used to control the speed of the first axle during braking.

The vehicle reference speed that may be identified for the first axle may be communicated to the inverter controller that controls operations of the inverter to control the speed at which the first axle may be rotated. The inverter controller determines the speed at which to rotate the first axle using the received vehicle reference speed and the inverter may be controlled to rotate the first axle accordingly, as described above. The vehicle reference speed that may be determined for the other axles by the reference speed processing module may be communicated to the other inverter controllers that control operations of the other respective inverters to control the speed at which the axles may be rotated. The other inverter controllers determine the speeds at which to rotate the axles using the received vehicle reference speed and the other inverters may be controlled to rotate the axles accordingly, as described above.

Figure 4:
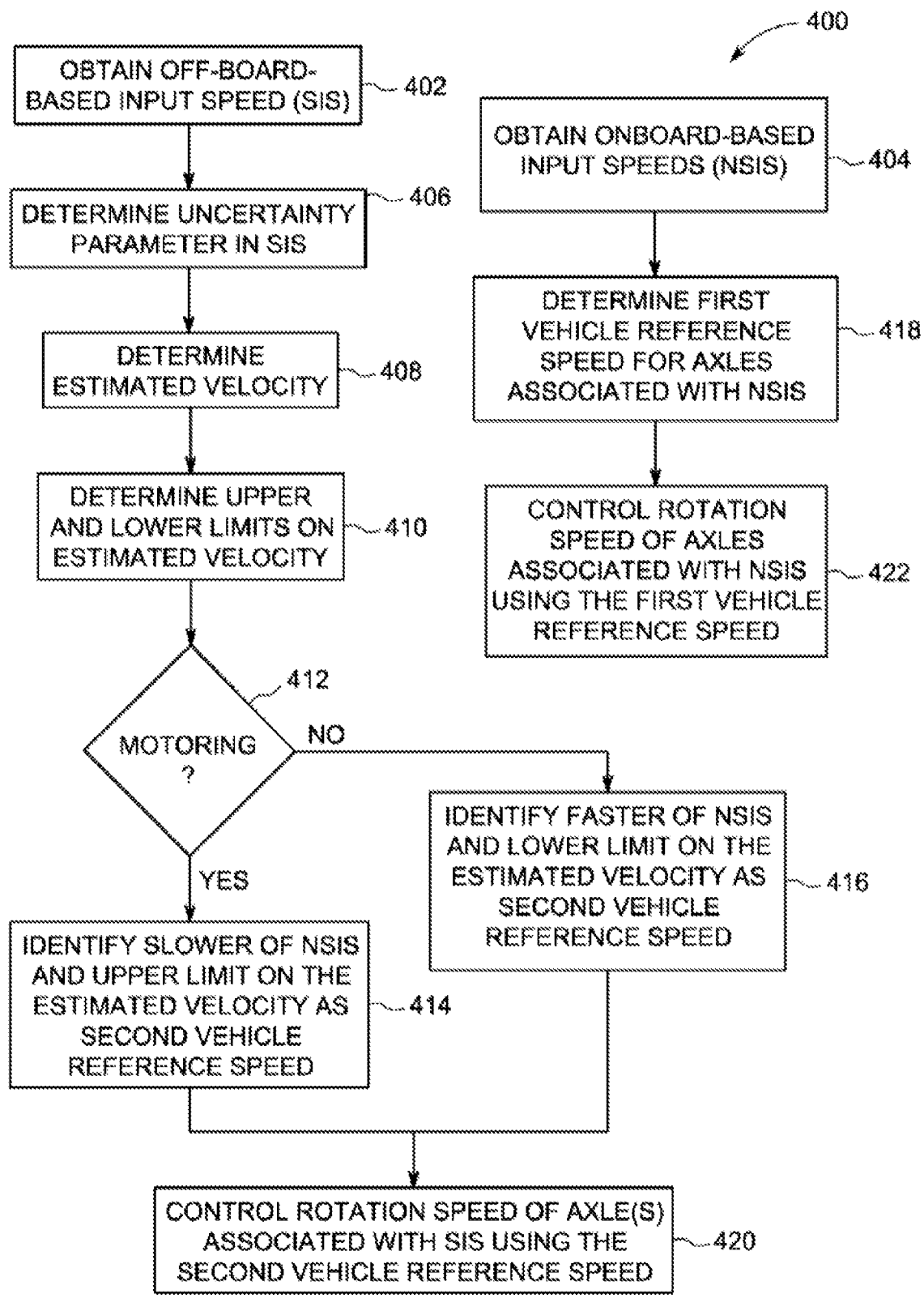
FIG. 4 is a flowchart of a method for controlling axles of a vehicle system according to one embodiment.

FIG. 4 is a flowchart of a method 400 for controlling axles of a vehicle system. The method may be used in conjunction with the vehicle system shown in FIG. 1, such as to allow for the control of movement of the vehicle system using the vehicle control systems (shown in FIGS. 1 and 2) described herein. The operations that may be described in connection with the method need not necessarily be performed concurrently, simultaneously, or sequentially in the orders shown in FIG. 4.

At 402, an off-board-based input speed ("SIS" in FIG. 4) may be obtained. For example, a GPS-based velocity of the vehicle (shown in FIG. 1) and/or the vehicle system may be determined as the vehicle system moves along the route (shown in FIG. 1). This off-board-based input speed may be associated with one or more axles (shown in FIG. 1) of the vehicle (shown in FIG. 1), such as the first axle or another axle.

At 404, one or more onboard-based input speeds ("NSIS" in FIG. 4) may be obtained. For example, wheel speeds for the wheels (shown in FIG. 1) connected to the axles may be measured as the onboard-based input speeds. The wheel speeds may be measured for one or more of the wheels that may be not connected to the axle associated with the off-board-based input speed (e.g., the first axle). Alternatively, the wheel speeds may be measured for the one or more of the wheels connected with this axle.

At 406, an uncertainty parameter of the off-board-based input speed may be determined. As described above, the uncertainty parameter may represent potential inaccuracies in the off-board-based input speed, such as those caused by only receiving data signals (shown in FIG. 1) from a relatively small number of off-board devices (shown in FIG. 1), low signal-to-noise ratios of the data signals, or the like.

At 408, an estimated velocity of the vehicle (and/or vehicle system) may be determined. This estimated velocity may be calculated using the uncertainty parameter, the filtered off-board-based input speed(s) and/or the tractive effort, as described above. At 410, upper and lower limits on the estimated velocity may be determined. These limits may be calculated using the uncertainty parameter to determine a range of velocities above and below this estimated velocity of the vehicle, as described above.

At 412, a determination may be made as to whether the vehicle may be motoring or braking. For example, a decision may be made as to whether the vehicle may be generating tractive effort to propel the vehicle or if the vehicle may be generating braking effort to slow or stop movement of the vehicle. If the vehicle may be motoring, then the speeds that may be used to determine the vehicle reference speed for the axle or axles associated with the off-board-based input speed may need to be slower speeds to avoid using faster speeds that may be indicative of wheel slip as a vehicle reference speed for those axle(s). As a result, flow of the method may proceed to 414.

On the other hand, if the vehicle may be braking, then the speeds that may be used to determine the vehicle reference speed for the axle or axles associated with the off-board-based input speed may need to be faster speeds to avoid using slower speeds that may be indicative of wheel slip (e.g., where a wheel may be not rolling along the route) as a vehicle reference speed for those axle(s). As a result, flow of the method may proceed to 416.

At 414, a vehicle reference speed (e.g., "second vehicle reference speed" in FIG. 4) for the axle or axles associated with the off-board-based input speed may be determined. This vehicle reference speed may be determined from the slower of the onboard-based input speeds for the other axles (that may be not associated with the off-board-based input speed) and the upper limit on the estimated velocity of the vehicle.

At 416, a vehicle reference speed (e.g., "second vehicle reference speed" in FIG. 4) for the axle or axles associated with the off-board-based input speed may be determined. This vehicle reference speed may be determined from the faster of the onboard-based input speeds for the other axles (that may be not associated with the off-board-based input speed) and the lower limit on the estimated velocity of the vehicle.

With respect to the axles associated with the onboard-based input speeds, at 418, a vehicle reference speed (e.g., "first vehicle reference speed" in FIG. 4) may be determined for these axles. This vehicle reference speed may be an average, median, maximum, minimum, or some other value derived from the onboard-based input speeds, as described above.

At 420 and 422, the vehicle reference speeds may be used to control the speeds at which the various axles may be individually rotated to propel the vehicle according to the power output associated with the selected throttle setting. For example, at 420, the axle or axles associated with the off-board-based input speed may be rotated to a speed within a range of speeds that may be based on the second vehicle reference speed. At 422, the axle or axles that may be not associated with the off-board-based input speed may be rotated to a speed within a range of speeds that may be based on the first vehicle reference speed.

The off-board-based input speeds and/or the onboard-based input speeds may be used by the control system to determine or measure one or more other operating characteristics of the vehicle. In one aspect, the control system compares onboard-based input speeds with off-board-based input speeds to calculate a creep value for one or more wheels of the vehicle. The control system may calculate a difference between the onboard-based input speed associated with an axle and the off-board-based input speed. This difference may represent an amount of creep for the wheels connected to that axle. The amount of creep can represent slippage between the wheels and the route. In some cases, a certain amount of creep (e.g., one to three percent or another value of difference between the input speeds) may be desired for increased efficiency in translating work of the engine disposed onboard the vehicle to tractive effort applied to the route. Too much creep, however, can result in the wheels losing adhesion with the route and result in reduced efficiency in translating this work. As used herein, wheel creep includes other related terminology, such as wheel slip and slip ratio, as well as other terms for loss of adhesion or traction.

The control system can compare the off-board and onboard-based input speeds for one or more of the axles to monitor the amount of creep associated with the wheels of the various axles. If the amount of creep may be too small (e.g., no greater than a designated threshold, such as no more than one percent, three percent, or another percentage), then the control system can direct the motors coupled to the axles to increase the amount of torque applied to the axles. If the amount of creep may be too large (e.g., greater than a designated threshold, such as greater than one percent, three percent, or another percentage), then the control system can direct the motors coupled to the axles to reduce the amount of torque applied to the axles.

In one aspect, the off-board-based input speeds may be based on data that may be obtained from and/or provided by the off-board devices periodically, as opposed to continuously. For example, the vehicle system may receive positional and/or velocity data from the devices at discrete points in time, with no positional and/or velocity data being received during the time periods that extend between these discrete points in time. During the time periods between when the position and/or velocity data may be received and/or the off-board-based input speeds may be determined, the control system may determine one or more estimated references speeds to use in controlling the torques applied by the motors. As described herein, the torques that may be applied by the motors to the axles and the speeds at which the motors rotate the axles to propel the vehicle system may be determined from a selected throttle setting of the vehicle system and a vehicle reference speed. The vehicle reference speed that may be used during the time periods between when the position data may be received and/or the off-board-based input speeds may be determined may be an estimated reference speed.

The estimated reference speed may be derived by extrapolating from previously used tractive efforts and resistive forces exerted on the vehicle system. For example, the control system may examine the tractive efforts applied by the motors of the vehicle system during a previous time period and/or the resistive forces exerted on the vehicle system during this time period to determine what estimated reference speed can be used to control the torques applied by the motors and/or rotational speeds of the motors. The estimated reference speed can be calculated so as to avoid abrupt changes in these torques or rotational speeds during the time periods between when the position and/or velocity data may be received and/or the off-board-based input speeds may be determined.

The control system may use the off-board-based input speeds and/or the onboard-based input speeds to estimate a size (e.g., mass and/or weight) of the vehicle system and/or resistive forces (e.g., drag) being experienced by the vehicle system. For example, using these input speeds, the control system may calculate acceleration of the vehicle system. The control system may know the amount of tractive effort (e.g., tractive or propulsive force) being applied by the vehicle system based on command signals used by the control system to control this tractive effort. Because the mass of the vehicle system may be proportional to the forces applied on the vehicle system and the inversely proportional to the acceleration of the vehicle system (e.g., F=ma, where F represents tractive efforts and a represents accelerations), the control system may estimate the mass of the vehicle system from the input speeds and tractive effort. For example, for larger tractive efforts and/or smaller accelerations, the control system may estimate heavier weights (e.g., masses) for the vehicle system. Conversely, for smaller tractive efforts and/or larger accelerations, the control system may estimate lighter weights (e.g., masses) for the vehicle system.

Once the size (e.g., weight or mass) of the vehicle system may be known or estimated (such as by being input into the control system by an operator using a manifest), then the control system may estimate resistive forces (e.g., drag, friction between the wheels 114 and the route 108 and the like) being experienced by the vehicle system. For example, the off-board-based and/or onboard-based input speeds may be used to calculate an acceleration of the vehicle system. The tractive efforts being applied by the vehicle system may be known, as described above. The mass and acceleration of the vehicle system may be used to estimate a total amount of force exerted on the vehicle system (e.g., F=ma, where F represents the total forces exerted on the vehicle system). If the tractive efforts may be known, the control system may estimate the resistive forces exerted on the vehicle system by removing the tractive effort component from the calculated total amount of force exerted on the vehicle system. The remaining amount of force may be an estimate of the resistive forces exerted on the vehicle system.

These resistive forces and previously applied tractive efforts can be used to estimate what tractive efforts should be applied by the motors so as to avoid abrupt changes in the torques applied by the motors and/or in the rotational speeds of the motors during the time periods between when the position and/or velocity data may be received and/or the off-board-based input speeds may be determined may be an estimated reference speed. For example, the control system may use the resistive forces and previously applied tractive efforts to calculate tractive efforts to be applied by the motors that do not significantly deviate from the previously applied tractive efforts or cause a significant change in the total forces applied to the vehicle system (e.g., where the tractive efforts and the resistive forces represent the total forces applied to the vehicle system). Based on these calculated tractive efforts, the control system determines the reference speeds to be communicated to the inverters of the motors so that the motors generate the calculated tractive efforts.

In accordance with one or more embodiments described herein, systems and methods provide for the real-time measurement of curvature in a route being traveled by a vehicle system (e.g., a single propulsion-generating vehicle or a group of one or more propulsion-generating vehicles and/or one or more non-propulsion generating vehicles mechanically coupled with each other). The term "real-time" means that the curvature of a route being traveled (referred to as "route curvature") can be measured by components disposed onboard the vehicle system as the vehicle system travels along the curvature in the route, as opposed to the vehicle system obtaining data during travel along the curvature in the route and later calculating the route curvature when the vehicle system may be no longer traveling and/or may be no longer traveling on the route curvature. As used herein, the term "curvature" or "route curvature" refers to a segment or subset of a route that may be curved (e.g., not linear). The curvature of a route may be represented by a radius of a circle or portion of another curved shape that matches or corresponds to the curvature of the route being measured.

The curvature of the route may be calculated by mathematically calculating the curvature of a rail or rails being traveled by a rail vehicle using measured speeds and/or heading of the rail vehicle. The curvature may not be determined with reference to a route database, such as a map or other memory structure that includes the curvature or layout of the route. For example, the curvature of the route may be measured without knowing the layout or position of the route. The measured curvature may be used to control operations of the vehicle, as described below.

In one aspect, the systems and methods described herein may measure route curvature without reference to or obtaining information from a route database that has previously measured or input information about the curvature of the route being traveled along. For example, the systems and methods described herein may determine the curvature of a route without obtaining previously calculated estimates of the curvature that may be stored in an onboard or off-board database (or other memory device or structure). Additionally or alternatively, systems and methods described herein may use the onboard measurement of the route curvature to validate and/or replace curvature data that was previously determined and stored in the database. For example, if the route curvature that may be measured during travel over a segment of a route does not correspond or match (e.g., may be not within a designated numerical range) of a previously measured curvature of the segment of the route that may be stored in a database or other memory structure, then the route curvature that may be currently measured may be stored in the database to replace or otherwise supplant the previously measured curvature.

Measuring the route curvature during travel along a route can provide for improved performance and control of the vehicle system. For example, measuring the route curvature can allow the operator or automatic control of the vehicle system to modify tractive efforts and/or braking efforts of one or more of the vehicles in the vehicle system to ensure that forces exerted on mechanical couplers (that link the vehicles with each other) stay within prescribed limits. Curved segments of the route can impact these forces and measuring the curvatures during travel on the curved segments can allow for the vehicle system to be manually and/or controlled to ensure that any changes to these coupler forces caused by the curvature may be modified by control of tractive efforts and/or braking efforts to ensure that the coupler forces do not become too positive (e.g., as tensile forces that could cause the couplers to break) or too negative (e.g., as compressive forces that could cause the vehicles in the same vehicle system to collide).

As another example, the vehicle system may be traveling along the route according to a trip plan that designates operational settings of the vehicle system as a function of time and/or distance along the route. The measured curvatures of the route that may be measured during travel of the vehicle system along the route may be used to create and/or modify the trip plan during travel of the vehicle system. For example, the operational settings designated by the trip plan may include the speed of the vehicle system, acceleration of the vehicle system, tractive efforts produced by the vehicle system, braking efforts produced by the vehicle system, throttle settings of the vehicle system and the like. The operational settings may be used to direct manual control of the vehicle system (e.g., by coaching or directing an operator to manually control the vehicle system according to the trip plan) and/or to control operations of the vehicle system. Traveling according to the trip plan can result in improved performance of the vehicle system in that the designated operational settings of the trip plan can reduce fuel consumption and/or emissions generation of the vehicle system (relative to the same vehicle system traveling over the same route(s) for the same trip, but using manual control without a trip plan or using a trip plan that designates different operational settings).

For one or more reasons, the designated operational settings of the trip plan may result in the vehicle system consuming more fuel, generating more emissions, producing larger coupler forces, or the like, than may be desired (e.g., by exceeding one or more previously designated thresholds). This may occur when the trip plan may be created using erroneous or outdated information, such as incorrect curvatures of the route. During travel of the vehicle system along a route according to the trip plan, the vehicle system can measure the route curvature in one or more segments of the route as the vehicle system travels over the one or more segments and compare the measured route curvatures with the route curvatures on which the trip plan may be based. If these curvatures do not match (e.g., may be not within a previously designated numerical range of each other), then performance of the vehicle system may suffer relative to if the route curvatures were closer to each other. For example, actual adhesion of the wheels in the vehicle system to the route may be less than desirable and result in increased fuel consumption, increased emission generation, increased coupler forces and the like, relative to the adhesion of the wheels that was expected or planned for when creating the trip plan. One or more components of the vehicle system may modify the trip plan to account for the differences in expected and actual curvatures. For example, if the vehicle system determines that the actual curvature has a smaller radius than the expected curvature used to create the trip plan, the vehicle system may modify the trip plan to modify unexpected coupler forces, slower travel, or the like, that was not anticipated or planned for when the trip plan was created. The vehicle system may continue along in the trip using the modified trip plan.

One or more embodiments described herein also may provide for the control of one or more adhesion-modifying devices based on a route curvature that may be measured by a vehicle system traveling along a curved segment of the route. During travel on a segment of the route that has relatively significant curvature (e.g., a relatively small radius of curvature), a lubricant may be applied to the route to reduce adhesion between the wheels of the vehicle system and the route so that the vehicle system may more easily travel through the curved segment of the route. In one aspect, the curvature of the route can be measured onboard the vehicle system and, if the curvature may be significant enough (e.g., the radius of curvature may be smaller than a designated threshold), then an adhesion-modifying device disposed onboard the vehicle system may apply lubricant to the route in response to this measurement. Additionally or alternatively, a command message may be communicated from the vehicle system to one or more off-board devices (e.g., wayside devices) disposed alongside the route in response to this measurement. This command message may direct these devices to apply lubricant to the route.

One or more embodiments described herein also may provide for detection of an intersection or a switch at an intersection between two or more routes. For example, onboard detection of the vehicle system following a curved path may indicate that the vehicle system has passed through and/or turned in an intersection between routes and/or has traveled over or through a switch, such as a switch between two tracks traveled upon by rail vehicles.

Figure 7:
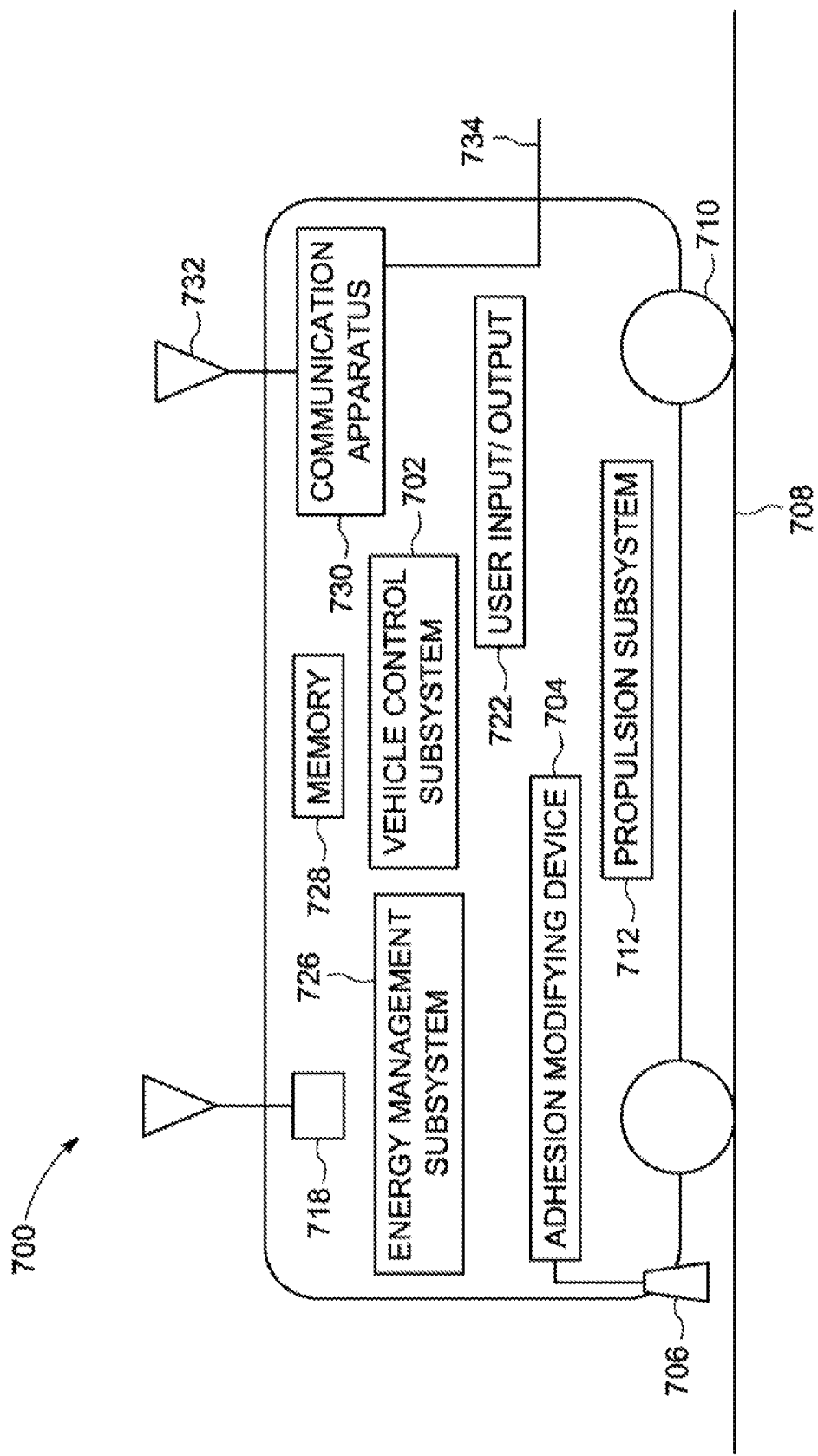
FIG. 7 is a schematic diagram of a vehicle according to one embodiment.

FIG. 7 is a schematic diagram of a vehicle 700 having an embodiment of a vehicle control system 702. The vehicle in FIG. 7 is similar to the vehicle shown in FIG. 1. For example, the vehicles may differ according to details of the components onboard the vehicle as described below. Optionally, the control system may be disposed onboard another vehicle, such as the vehicle 106 shown in FIG. 1.

A propulsion subsystem 712 of the vehicle generates tractive effort to propel the vehicle along a route 708, similar to the propulsion subsystem (shown in FIG. 1). A user input and/or output device 722 ("User Input/Output" in FIG. 7) represents one or more devices that can be manually actuated to control one or more components of the vehicle that may be shown in FIG. 7 and/or provide information to an operator of the vehicle. The output device can represent the user input shown in FIG. 1. The output device can include one or more throttles, brake controls, buttons, switches, levers, touchscreens, keyboards, microphones, display screens and the like.

An onboard energy management subsystem 726 represents one or more hardware components (e.g., one or more processors that operate based on instructions, such as software, stored on a computer readable, tangible and/or non-transitory component, such as a computer memory 728) obtains a trip plan for controlling the vehicle and/or a vehicle system that includes the vehicle. Optionally, the energy management subsystem may be disposed off-board the vehicle and/or the vehicle system that includes the vehicle.

The energy management subsystem may obtain the trip plan by receiving the trip plan from an off-board location (e.g., a dispatch center or other location) or by creating the trip plan. The trip plan designates operational settings of the vehicle and/or a vehicle system that includes the vehicle (e.g., the vehicle system) to improve one or more operational variables of the vehicle and/or the vehicle system, subject to one or more operating constraints of the vehicle and/or vehicle system. The operational settings may include throttle settings, brake settings, speeds, accelerations, power outputs, motor rotational speeds, electric current generated by onboard generators and/or alternators, forces exerted on couplers disposed between vehicles in the vehicle system, segments of routes to be traveled on to reach a location and/or the like. The operational settings may be designated by the trip plan as a function of time and/or distance along a trip or route to one or more locations. For example, for a trip of the vehicle or vehicle system, a trip plan may dictate different throttle settings and/or different speeds for different locations along the route.

The operational variables that may be improved by the trip plan can include fuel consumption, emission generation, travel time to one or more locations and the like. The term "improve" means that the variable being referred to may be increased or decreased relative to some designated objective value. Controlling the vehicle and/or vehicle system according to a trip plan that seeks to improve fuel efficiency may result in the vehicle consuming less fuel, producing fewer emissions and/or reaching a destination location in less time relative to some objective benchmark. The objective benchmark can be designated or set by an owner or operator of the vehicle and/or vehicle system, a governmental body, a previous trip of the vehicle and/or vehicle system along the same route to the same location. For example, following the trip plan can cause the vehicle and/or vehicle system consume less fuel (e.g., at least 1 to 3 percent, or another value), produce fewer emissions and/or reach a location in less time than the previous trip of the vehicle and/or vehicle system to the same location along the same route where the vehicle and/or vehicle system was manually controlled or not controlled according to the trip plan. In one aspect, controlling the vehicle system according to a trip plan can cause the vehicle system to consume less fuel, produce fewer emissions and/or reach a location in less time than the same vehicle system traveling over the same routes and route segments but using one or more operational settings (e.g., throttle settings, speeds, power outputs, brake applications, or the like) that differ from the operational settings designated by the trip plan at one or more locations along the trip.

The operating constraints to which the trip plan may be subject may include speed limits, slow orders, weather conditions, upper limits on working hours of an onboard crew, a schedule for the vehicle system and the like. These operating constraints may prevent the trip plan from directing the vehicle system to travel too slow, apply the brakes too many times and the like, so that the constraints may be satisfied (e.g., not violated).

The energy management subsystem can create and/or modify the trip plan onboard the vehicle and/or can receive the trip plan from an off-board location, such as a dispatch center or other location not on board the vehicle system that includes the vehicle. A communication apparatus 730 includes communication hardware and associated circuitry and software (where applicable) for communicating information between the vehicle and one or more other vehicles of the same vehicle system, one or more other vehicles in another vehicle system, or an off-board location. For example, the communication apparatus can include transceiver circuitry, an antenna 732 for wireless communication, one or more routers, modems and the like for communicating via a wired connection 734 (e.g., a conductive pathway extending between vehicles in the vehicle system, such as a multiple unit line, train line, electronically controlled pneumatic brake line, or the like). The communication apparatus can receive information used by the energy management subsystem to create and/or modify a trip plan, can receive a trip plan and/or can communicate a trip plan with one or more other vehicles, vehicle systems and/or off-board locations.

The vehicle includes an adhesion modifying device 704 that may be controlled to change adhesion of wheels 710 of the vehicle to the route. For example, the adhesion modifying device may include a blower or fan that directs air (e.g., cold air, hot air, or room temperature air) onto the route to clear the route of debris (and thereby increase adhesion between the wheels and the route). As another example, the adhesion modifying device may dispense a substance onto the route, such as sand, gravel, an adhesive, or the like, to change adhesion between the wheels and the route. The adhesion modifying device can apply a lubricant, such as an oil, onto the route to reduce adhesion and assist with movement of the vehicle system. For example, when traveling over curved segments of the route, a lubricant can be applied to the route to allow the wheels of the vehicle system to more easily move along the route. The adhesion modifying device may be manually and/or controlled by the control system. Optionally, the adhesion modifying device may be disposed off-board of the vehicle but may be controlled using signals communicated from the vehicle.

The vehicle includes a position and/or velocity data receiver 718 that may be similar or identical to the position and/or velocity data receiver shown in FIG. 1. Using position and/or velocity data (e.g., position and/or velocity data signals) acquired by the position and/or velocity data receiver, the vehicle (e.g., the vehicle control system) can measure curvatures of the route 708 being traveled by the vehicle. The position and/or velocity data can be received from off-board devices, such as the devices shown in FIG. 1.

Figure 8:
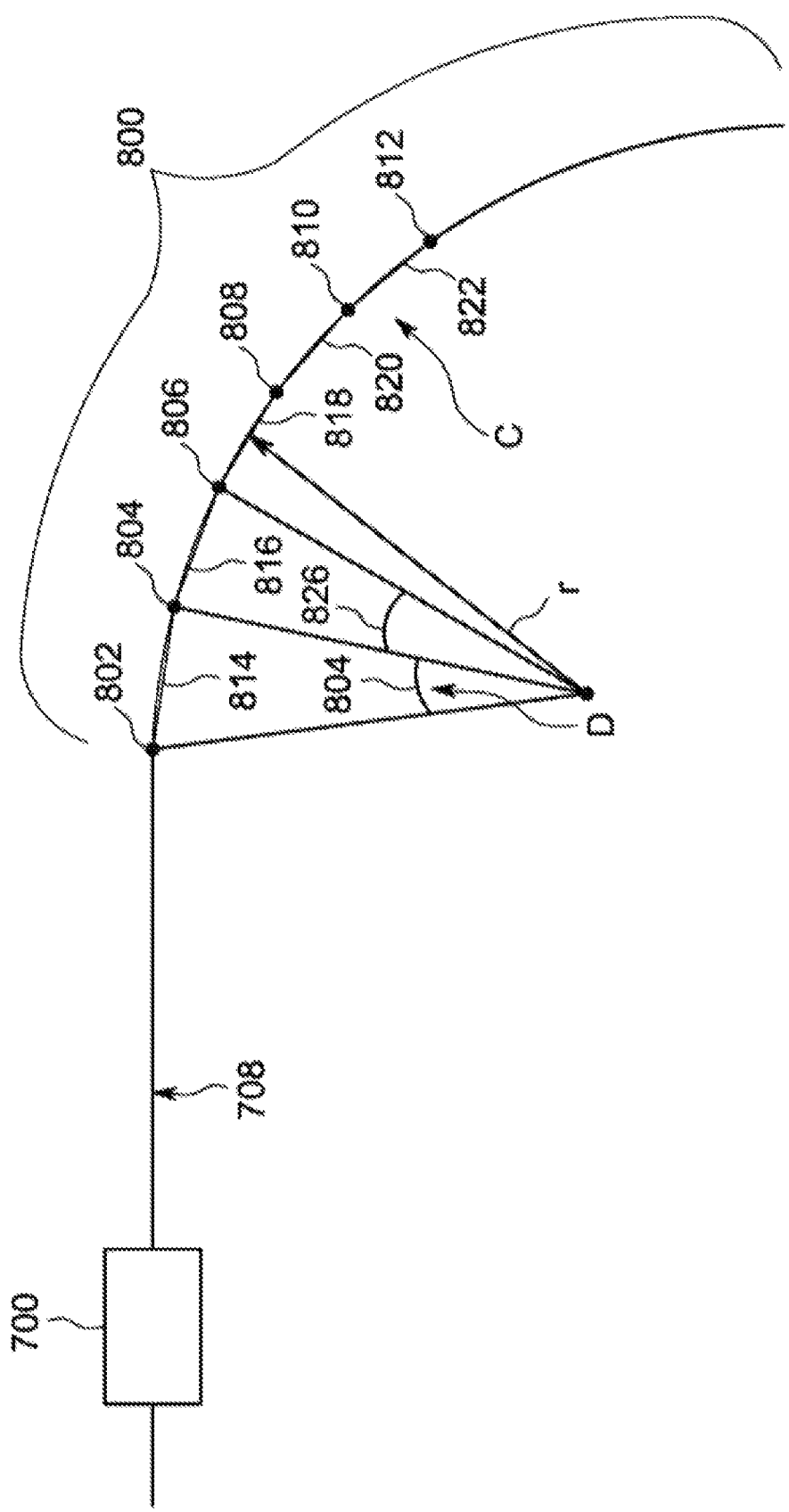
FIG. 8 is a schematic diagram of the vehicle shown in FIG. 7 traveling along a segment of a route according to one embodiment.

With continued reference to the vehicle shown in FIG. 7, FIG. 8 illustrates a schematic diagram of one example of the vehicle traveling along a segment 800 of the route. The vehicle may be included in a larger vehicle system that may be not shown in FIG. 8. During travel along the route, the position and/or velocity data receiver obtains position and/or velocity data signals from the off-board devices to determine headings of the vehicle. As used herein, the heading of the vehicle refers to the course or direction of travel of the vehicle. For example, the vehicle may have a heading of 90° when the vehicle travels east, a heading of 180° when the vehicle travels south, a heading of 270° when the vehicle travels west, a heading of 0° when the vehicle travels north and so on. The heading may be communicated to the position and/or velocity data receiver in the signals received from the off-board devices. Optionally, the heading may be derived from position and/or velocity data received from the off-board devices. For example, if the position and/or velocity data signals indicate the geographic location (e.g., longitude, latitude and/or elevation) of the vehicle, then position and/or velocity data signals for two or more different locations may be used to calculate the heading of the vehicle.

In one aspect, only headings of the vehicle are used to determine curvatures of routes being traveled upon. For example, the systems and methods described herein may calculate or estimate curvatures of a curved route segment using GPS headings and not using any geographic locations or coordinates, such as GPS coordinates.

The position and/or velocity data signals may be acquired and/or the headings of the vehicle may be determined periodically, upon manual prompt by the operator of the vehicle (e.g., using user input/output 722), in response to one or more events, or the like. The events that may cause the acquisition of data signals and/or determining the heading may include the heading of the vehicle deviating from a designated heading (e.g., as acquired from the memory 728) by at least a designated amount (and thereby indicating that the designated curvature of the route may not match or correspond with the actual curvature). Optionally, actual operations of the vehicle deviating from the operations designated by a trip plan (e.g., actual speed does not match the designated speed) may cause the heading of the vehicle to be determined.

In the illustrated example, the headings of the vehicle may be determined from the signals received from the off-board devices for locations 802, 804, 806, 808, 810, 812 of the vehicle. The radius of curvature (e.g., the curvature of the first route segment) may be determined from these headings. For example, the radius of curvature of the first route segment may be calculated from one or more of the following relations:

$$r = \frac{2\pi C}{360D} \quad \text{(Equation \#1)}$$

where r represents the radius of curvature of the first route segment, C represents a chord length and D represents a degree of curvature of the first route segment. The chord length C may be a straight-line distance between two of the locations where the heading may be determined. For example, chord lengths 814, 816, 818, 820, 822 may be used. Optionally, chord lengths may be measured between two or more other locations, such as first location and third location, second location and sixth location, or the like. The chord length C may be a designated distance, such as 100 feet (e.g., 30.48 meters). Or, the chord length C may change based on the time period between when the headings may be measured and how fast the vehicle may be traveling. For example, the chord length C will increase if the time period between determining the headings and/or the speed increases.

The degree of curvature D of the first route segment may represent a deflection angle (measured in degrees, for example) that may be subtended (e.g., bounded by) the chord length C. In the examples shown in FIG. 8, the chord length 802 may be associated with a degree of curvature 824, the chord length 804 may be associated with a degree of curvature 826 and so on. The degree of curvature D for a chord length C can be determined from the following relation:

$$D = \frac{d(\text{heading})/dt}{d(\text{distance})/dt} = \frac{d(\text{heading})/dt}{v} \quad \text{(Equation \#2)}$$

where d(heading)/dt represents the change in the heading of the vehicle with respect to time and both d(heading)/dt and v represent the moving speed of the vehicle.

In one aspect, the control system may use "rollover protection" to prevent relatively small changes in the heading of the vehicle across the magnetic north direction from being confused with more significant changes in headings. For example, if a heading along magnetic north may be referred to by an angle of zero degrees, then a heading that changes from slightly east of north (e.g., 2 degrees) to slightly west of north (e.g., 357 degrees) may be treated by the control system as a change of 5 degrees (e.g., moving from 2 degrees to 357 degrees across magnetic north) as opposed to a change of 355 degrees (e.g., moving from 2 degrees to 357 degrees without crossing magnetic north). The control system may use this rollover protection if the change in headings may be larger than a designated threshold. This threshold may change or be based on the rate at which the headings may be obtained. For example, the heading threshold may increase when the headings may be measured less frequently (and, as a result, a larger change in heading may be more realistically possible). Conversely, the heading threshold may decrease when the headings may be measured more frequency (and, as a result, a larger change in heading may be less realistically possible).

The control system may filter the rate of heading change (e.g., d(heading)/dt) based on the speed of the vehicle. For example, the control system can apply a spatial low pass filter that filters more of the rates of heading change when the vehicle speed increases and that filters less of the rates of heading change when the vehicle speed decreases. For example, the control system may remove some of the rates of heading change from the calculation of the radius of curvature. The rates of heading change that may be removed or not used in the calculation of the radius of curvature can be based on the speed of the vehicle. As the speed of the vehicle increases, more of the rates of heading change may be eliminated or not used to calculate the radius of curvature. As the speed of the vehicle decreases, less of the rates of heading change may be eliminated or not used to calculate the radius of curvature.

In one aspect, the heading of the vehicle that may be monitored by the control system may be reset responsive to one or more events. The heading may be reset by changing or setting the value of the heading to a designated amount, such as zero or another direction. The events that may cause the resetting of the heading may include the uncertainty parameter (described above) becoming too large, such as larger than a first designated threshold. Another event may be the signal-to-noise ratio of the signals received from the off-board devices falling below a second designated threshold. Another event may be the number of off-board devices from which the signals may be received by position and/or velocity data receiver being less than a third designated threshold, or no greater than a fourth designated threshold.

The radius of curvature R of the route may be measured one or more times during travel of the vehicle over the segment and compared to a previously designated or measured curvature of the segment. For example, the currently measured curvature may be compared to the curvature stored in the memory of the vehicle and/or the curvature used to create or modify the trip plan. If the measured curvature may be different from the curvature stored in the memory and/or used to create or modify the trip plan (e.g., by at least a designated amount), then the stored curvature may be replaced or updated with the measured curvature and/or the trip plan may be modified with the updated curvature.

The control system may estimate forces exerted on the couplers that mechanically couple the vehicles in the vehicle system with each other. For example, the control system may estimate these forces based on the curvature of the route segment being traveled upon by the vehicle system. For smaller radii of curvature, the control system may estimate greater forces (e.g., larger compressive forces or larger tensile forces) relative to larger radii of curvature. The control system may warn an operator when the estimated coupler forces may be growing too large (e.g., using the user input/output) and/or modify control of the vehicle system. For example, the control system may direct the operator to manually slow movement of the vehicle system and/or slow movement of the vehicle system when the estimated coupler forces grow too large.

The control system may modify the adhesion of the wheels to the route based on the curvature of the route that may be measured. In response to measuring the curvature of the route being traveled on (e.g., when the radius of curvature may be smaller than a designated radius), the control system may direct the operator to manually control the adhesion modifying device and/or may control the device to change one or more characteristics of the route as the vehicle travels over the route to modify adhesion of the wheels of the vehicle on the route. By way of example, the adhesion modifying device may apply one or more friction-modifying substances to the route that change the coefficient of friction between the wheels and the route (e.g., sand, lubricant, or the like). Optionally, the adhesion modifying device may direct the flow of a fluid (e.g., gas such as air, liquid, or the like) toward the route to clean the route. In another example, the adhesion modifying device may physically or mechanically engage the route to clean the route. Optionally, the adhesion modifying device may engage the route to remove a portion of the route, such as by sanding the route.

The adhesion modifying device may include two or more applicator devices through which friction-modifying substances (e.g., air, sand, lubricant and the like) may be applied to the route and/or the device engages the route. With respect to rail vehicles, the device may include an applicator device over each one of the rails being traveled along. The applicator devices can include nozzles that direct friction-modifying substances toward the route, brushes that clean the route, or the like.

Additionally or alternatively, one or more of the applicator devices can represent a sanding device that removes part of the route. For example, such a sanding device can engage the route and sand down (e.g., smoothen) the top surface of the route that may be engaged by the sanding device. With respect to rail vehicles, the top sides of the rails can become damaged. Sanding these top sides of the rails can remove the damage and prolong the life of the rails by preventing the damage (e.g., cracks and microcracks) from spreading.

In one aspect, the control system and/or the adhesion modifying device can control how much friction modifying substances may be applied to the route based on the curvature of the route that may be measured. For example, the control system and/or the adhesion modifying device may apply greater amounts of lubricant to the route for segments of the route having smaller radii of curvature relative to segments of the route having larger radii of curvature. The increased amount of lubricant may assist the vehicle in more easily traveling over the smaller radii of curvature, where the wheels may otherwise have more friction with the route relative to larger radii of curvature.

The control system and/or the adhesion modifying device can control the what type of friction modifying substances may be applied to the route based on the curvature of the route that may be measured. For example, the control system and/or the adhesion modifying device may apply substances (e.g., lubricant) that reduce the coefficient of friction between the wheels and the route for radii of curvature in the route that may be smaller than a threshold radius and apply substances (e.g., sand) that increase this coefficient of friction for larger radii of curvature.

The control system and/or the adhesion modifying device can control the rate at which the friction modifying substances may be applied to the route based on the curvature of the route that may be measured. For example, the control system and/or the adhesion modifying device may friction modifying substances at a larger rate of flow for segments of the route having smaller radii of curvature relative to segments of the route having larger radii of curvature. The increased rate of substances may assist the vehicle in more easily traveling over the smaller radii of curvature by applying more of the substance.

The control system may use the radius of curvature that may be measured and the heading of the vehicle to determine whether to deactivate the device and/or one or more of the applicator devices. Optionally, the control system may use the radius of curvature that may be measured to change a position of one or more of the applicator devices.

Figure 10:
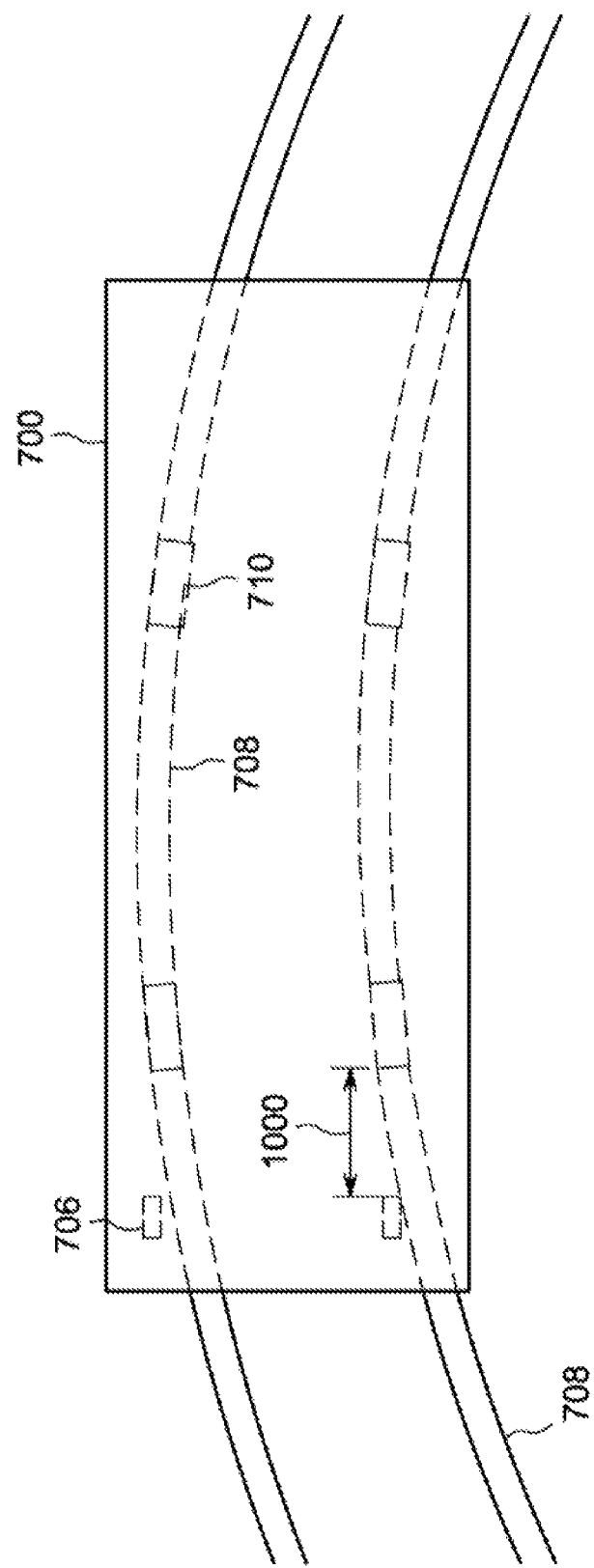
FIG. 10 is a top view of the vehicle shown in FIG. 7 traveling over a curved segment of the route according to one embodiment.

FIG. 10 illustrates a top view of the vehicle traveling over a curved segment of the route. As shown, the curvature of the route causes the applicator devices of the adhesion modifying device to not be located over the route. For example, a distance 1000 between the wheels of the vehicle and the applicator devices may be sufficiently long and the curvature of the route may be sufficiently small to cause the applicator devices to be located between tracks that form the route and/or be disposed outside of the route, as shown in FIG. 10.

The control system may deactivate those applicator devices that may be pointed away from the route (e.g., tracks) when the measured curvature of the route may be smaller than a designated threshold. For example, when the vehicle may be traveling over a relatively tight curve in the route, the applicator devices may be positioned such that any friction-modifying substances will not be applied to the route and/or the applicator devices do not engage the route. The control system may compare the measured radius of curvature to the designated threshold to determine if the applicator devices may be disposed over and/or may be engaging or positioned to engage the route. If the measured radius may be at least as large as the threshold, then the applicator devices may be directed toward the route such that the friction-modifying substances delivered from the devices will be applied to the route and/or such that the devices engage or may be positioned to engage the route. As a result, the control system may activate or keep the devices active to apply the friction-modifying substances to the route and/or engage the route.

If the measured radius may be not as large as the threshold, then the applicator devices may not be directed toward the route such that the friction-modifying substances delivered from the devices will not be applied to the route and/or such that the devices do not engage or may be not positioned to engage the route. Allowing such applicator devices to apply the friction-modifying substances may actually result in the substances being applied to the ground between or outside of the rails, which can waste the supply of the substances and/or stir up dirt, debris and the like and further negatively impact adhesion of the wheels to the route. As a result, the control system may deactivate or otherwise prevent the devices from applying the friction-modifying substances to the route and/or from engaging the route.

Figure 11:
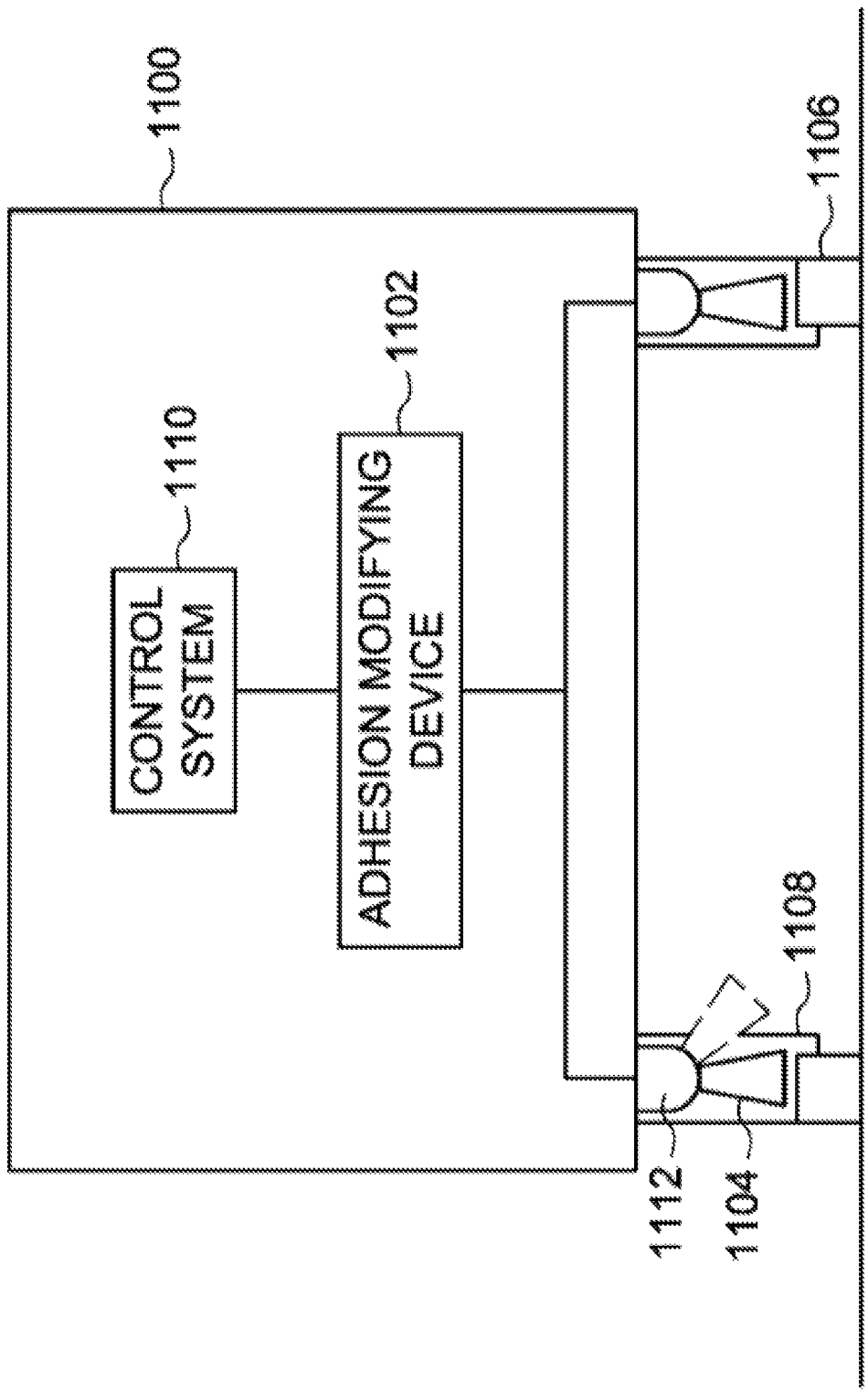
FIG. 11 is a front view of a vehicle according to one embodiment.

FIG. 11 is a front view of an embodiment of a vehicle 1100. The vehicle may represent one or more of the vehicles shown in FIGS. 1 and 7, or another vehicle. The vehicle includes a control system 1110 (such as the control system of FIG. 7) and an adhesion modifying device 1102 (such as the adhesion device of FIG. 7). The adhesion modifying device controls applicator devices 1104, similar to the actuator devices of FIG. 7, to apply friction-modifying substances to a route 1106 that may be being traveled by the vehicle, to clean the route, to sand the route and the like. Although the route may be shown as being parallel tracks being traveled upon by wheels 1108 of a rail vehicle, the route may optionally be a road or other surface.

The applicator devices may be connected to actuators 1112 that may be controlled by the adhesion modifying device to move the applicator devices. The actuators may include or represent one or more motors (e.g., servo motors, pneumatic motor, electric motor, or the like), gears, pinions, screws, wheels, axles, or the like, that may be controlled by the adhesion modifying device to change an orientation of the applicator devices. As shown in FIG. 11, the actuators may move the applicator devices by turning the applicator devices inward (e.g., to the right in the view of FIG. 11 and as shown in dashed lines) and/or outward (e.g., to the left in the view of FIG. 11). The actuators may be controlled to move the applicator devices to point inward or outward and, as a result, direct friction-modifying substances inward or outward relative to the vehicle, engage the route at an angle, or the like.

The control system may use the measured curvature of the route to direct the adhesion modifying device to control the orientation of the applicator devices. For example, as described above in connection with FIG. 10, the curvature of the route may be sufficiently small that the applicator devices may be located outside of the route (e.g., such that an applicator device may be outside of the curved segment of the route) and/or inside of the route (e.g., such that an applicator device may be inside the curved segment of the route or disposed above a location that may be between the tracks of the route). In such a situation, the control system may direct the adhesion modifying device to control the actuators to change the orientation of the applicator devices. The actuator connected to the applicator device that may be outside of the curved segment of route may bias (e.g. move) the applicator device inward, so that the applicator device may be directed more toward the route than the applicator device would be without biasing the device. The actuator connected to the applicator device that may be inside of the curved segment of route may bias (e.g. move) the applicator device outward, so that the applicator device may be directed more toward the route than the applicator device would be without biasing the device.

The control system may decide when to bias the applicator devices by comparing the measured curvature of the route to one or more designated thresholds. These thresholds may represent different curvatures of the route and may be separately associated with different amounts of biasing (e.g., movement) of the applicator devices. Depending on which of the thresholds may be exceeded and/or not exceeded by the measured curvature of the route, the control system may direct the adhesion modifying device to control the actuators and change the orientations of the applicator devices by different amounts. For example, for smaller radii of curvature in the route, the actuators may move the applicator devices by greater amounts relative to larger radii of curvature in the route.

Figure 9:
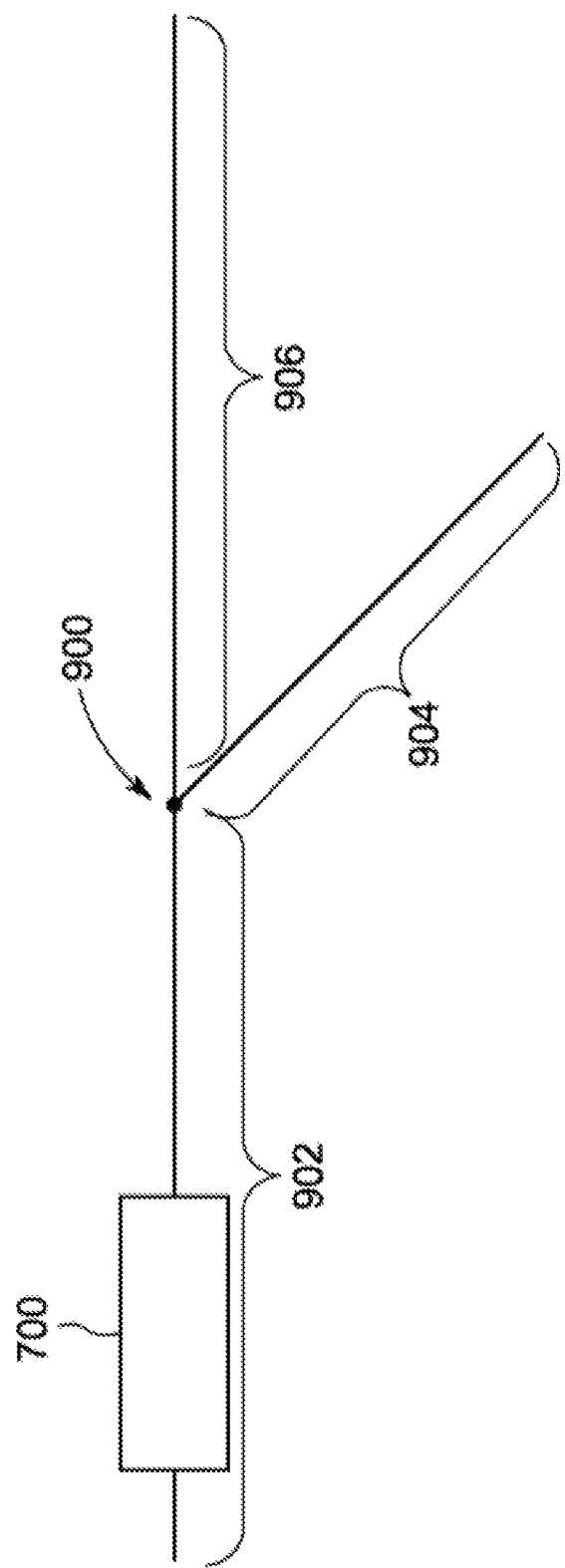
FIG. 9 is a schematic diagram of the vehicle shown in FIG. 7 traveling toward a switch in the route according to one embodiment.

With renewed reference to the vehicle shown in FIG. 7, FIG. 9 illustrates one example of the vehicle traveling toward a switch 900 along the route. The switch represents a mechanism that can be actuated to direct which of two or more route segments 902, 904, 906 of the route that the vehicle travels on when the vehicle travels through or over the switch. For example, in a first state or position, the switch may direct the vehicle to travel from the route segment to the route segment. In a different, second state or position, the switch may direct the vehicle to travel from the route segment to the route segment.

The control system can detect which route segment may be being traveled upon when the vehicle travels over the switch and/or detect the state of the switch based on the route curvature that may be measured. For example, as the vehicle travels over the switch, the control system can measure the route curvature as described above. The relative locations of the route segments may be known (e.g., stored in the memory). Based on the route curvature that may be measured, the control system can determine if the vehicle traveled from the route segment to the route segment or from the route segment to the route segment. For example, a larger radius of curvature that may be measured by the control system may indicate that the vehicle traveled from the route segment to the route segment. A smaller radius of curvature may indicate that the vehicle traveled from the route segment to the route segment.

The control system can use the identification of which route segment may be being traveled upon to ensure that the vehicle may be not entering into a restricted area, such as a section of the route that may be currently occupied by another vehicle system, that may be being repaired by a maintenance crew, that may be not along the path that the vehicle system may be to take to reach a destination and the like.

The energy management system can use the identification of which route segment may be being traveled upon to ensure that the vehicle may be traveling according to the trip plan. For example, the trip plan may dictate which route segments that the vehicle may be to travel along. Upon traveling through or across the switch, the control system may determine that the vehicle may be not traveling on a segment of the route that may be designated by the trip plan. For example, the trip plan may direct the vehicle to travel from the segment to the segment, or from the segment to the segment. If the control system determines that the vehicle may be not traveling on the segments designated by the trip plan (such as when the switch malfunctions, may be modified to an incorrect state, or the like), then the control system may notify the energy management system. The energy management system may modify or revise the trip plan (e.g., into a modified trip plan) to account for and include the vehicle traveling on the segment of the route 708 that the vehicle may be currently traveling on, but that was not included in the previous trip plan.

Figure 12:
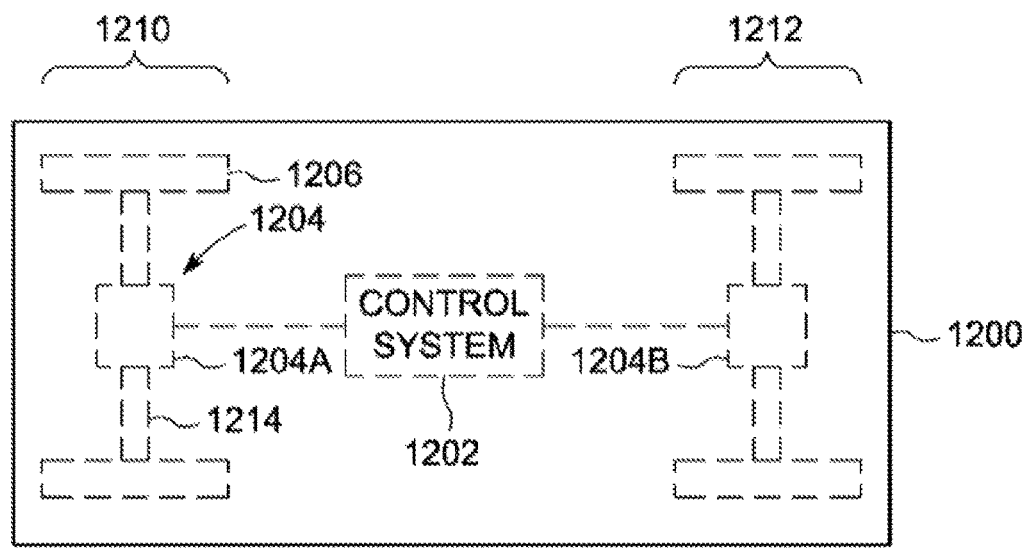
FIG. 12 is a top view of a vehicle according to one embodiment.
Figure 13:
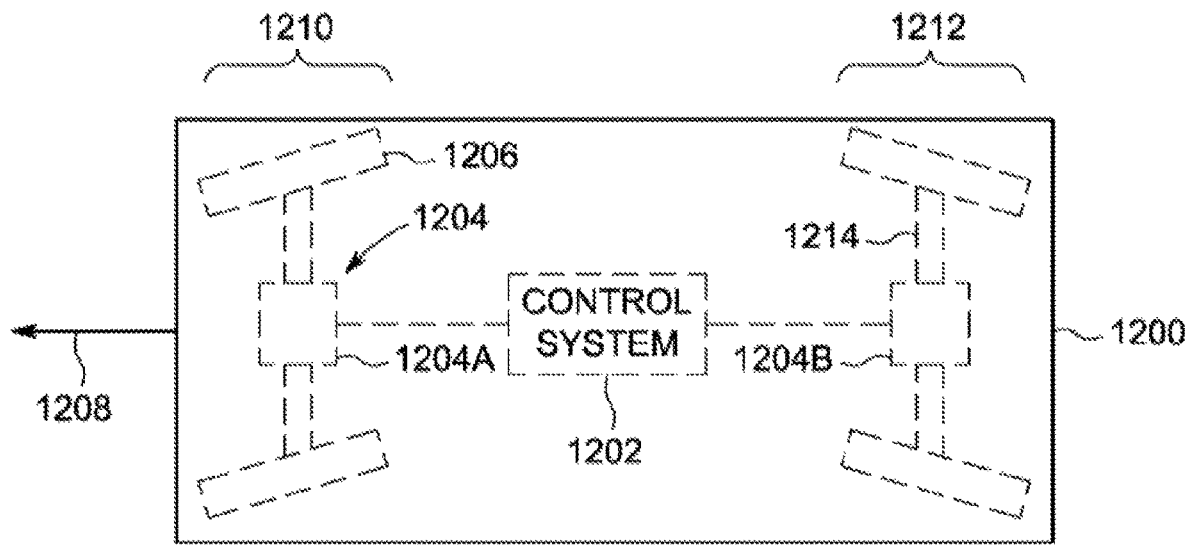
FIG. 13 is a top view of the vehicle shown in FIG. 12 according to one embodiment.

FIGS. 12 and 13 illustrate top views of an embodiment of a vehicle 1200. The vehicle may represent the vehicle shown in FIGS. 1, 7 and 11. For example, the vehicle may be a propulsion-generating vehicle that may be capable of generating tractive effort to propel itself, such as a locomotive, or may be a non-propulsion-generating vehicle that may be incapable of generating tractive effort to propel itself, such as a railcar.

The vehicle includes a control system 1202, such as the control system of FIG. 7, or FIG. 11. The control system may be communicatively coupled (e.g., by one or more wired and/or wireless connections) with one or more steering systems 1204 (e.g., systems 1204A, 1204B) of the vehicle. The steering systems may be connected with wheels 1206 of the vehicle and can turn the wheels as shown in FIG. 13. The first steering system steers the wheels of a first set 1210 of the wheels while the second steering system steers the wheels of a second set 1212 of the wheels.

The steering systems can turn the wheels to allow the vehicle to more easily travel over curved segments of a route, such as the route (shown in FIGS. 1 and 7). For example, without being able to turn the wheels, more force may be required to move the wheels and the vehicle along curved segments of the route due to the fact that the wheels may be rigidly oriented along a linear direction during travel over a curved route.

The steering systems can include or represent gears, pinions, axles, actuators, motors, or the like, for turning the wheels left or right relative to a direction of travel 1208 of the vehicle. The steering systems may include or be coupled with axles 1214 that may be joined with the wheels. In one aspect, one or more of the steering systems may include or represent a propulsion-generating device, such as a motor. The propulsion-generating device may be directly or indirectly coupled with one or more of the wheels or axles to rotate the wheels and/or axles and generate tractive effort to propel the vehicle along the route.

The first steering system turns the wheels of the set to the left relative to the direction of travel and the second steering system turns the wheels of the set 1212 to the right relative to the direction of travel. The steering systems may turn the wheels in this manner when the vehicle may be traveling over a segment of the route that may be curved to the left relative to the direction of travel. The first steering system may turn the wheels of the set to the right relative to the direction of travel and the second steering system may turn the wheels of the set to the left relative to the direction of travel when the vehicle may be traveling over a segment of the route that may be curved to the right relative to the direction of travel. Optionally, the vehicle may include only one of the steering systems that turns the wheels of only a single set, or that turns the wheels of multiple sets. While only four wheels and two sets may be shown, the vehicle may include a different number of wheels and/or sets.

The control system may measure the curvature of a route being traveled upon (as described above) and control one or more of the steering systems to turn the wheels along the measured curvature of the route. The control system may control how far each or both of the steering systems turn the wheels based on the measured route curvature. For example, for smaller measured radii of curvature in the route, the control system may direct the steering systems to turn the wheels more than for larger measured radii of curvature in the route.

As described above, one or more of the steering systems may include a propulsion-generating device to propel the vehicle. For example, the first steering system and/or the second steering system may include one or more traction motors that may be powered to rotate the corresponding axle and rotate the wheels connected to the axle. The torques applied to the axles by the steering systems may be controlled using the curvature of a route segment being traveled on to control the shifting of weight between the axles. For example, if the vehicle may be traveling on a curved segment of the route in the direction of travel, the control system may measure the radius of curvature (as described above) and use this radius to change the torque applied by the first steering system and/or the torque applied by the second steering system to the respective axles to propel the vehicle.

In one aspect, the control system may reduce the torque applied by the "rear" second steering system (e.g., the steering system that follows one or more other steering systems on the same vehicle along the direction of travel) and/or increase the torque applied by the "leading" first steering system (e.g., the steering system that may be ahead of one or more other steering systems on the same vehicle along the direction of travel. If the vehicle includes more than two steering systems, then one or more of the steering systems may be both a rear steering system relative to at least one other steering system and a leading steering system relative to at least one other, different steering system.

By "reduce the torque," it may be meant that the control system may reduce the torque applied by the second steering system on the axle connected to the second steering system relative to the torque applied by the second steering system on the axle when the vehicle may be traveling along a straight segment of the route. In one aspect, the control system directs the rear second steering system to stop applying torque to the axle (e.g., the rear second steering system applies no torque to the axle).

Optionally, the control system may reduce the torque applied by the second steering system relative to the torque applied by the other first steering system. For example, for a designated speed of the vehicle obtained from a trip plan, a manually selected throttle setting of the vehicle, or another input into the control system that dictates a power output or speed of the vehicle, the control system may command the traction motors of the steering systems to apply a certain amount of torque. The amount of torque applied by the steering systems on a straight segment of the route may be the same or approximately the same (e.g., with any differences due to noise in measurements of the torque, communication delays, or manufacturing variances). In one aspect of the inventive subject matter, the control system may reduce the torque applied by the rear steering system but increase the torque applied by the leading steering system responsive to and/or proportional to the measured radius of curvature of the route being traveled upon. The decrease in torque applied by one or more steering systems of the vehicle may be equivalent to or substantially equivalent to the increase in torque applied by one or more other steering systems of the same vehicle such that the total torque applied by the steering systems of the vehicle remains the same or substantially the same. Optionally, the torques applied by the steering systems may change such that the total torque applied by the steering systems does not remain the same.

The torque may be decreased and/or increased by the steering systems in intervals. For example, instead of dropping the torque applied by a steering system from a current value to a reduced value, the control system may incrementally decrease the torque applied by the steering system from a current value to a final reduced value. The control system may reduce the torque by a first amount for a first non-zero time period, then an additional amount for an additional non-zero time period and so on, until the torque may be at the final reduced value.

The torque may be decreased for the rear steering system to shift the weight of the vehicle between the axles while traveling on the curved segment of the route. Decreasing the torque applied by the rear steering system causes at least some of the weight borne by the rear steering system to be transferred to one or more other steering systems (e.g., the leading steering system or a steering system that does not reduce torque). Shifting this weight between the axles can allow a larger portion of the weight of the vehicle to be borne by the axles that lead other axles along the direction of travel and make it easier for the vehicle to maintain speed through the curved segment of the route. Once the weight has been shifted between the axles, the control system can increase the torque applied by the rear steering system and/or decrease the torque applied by the leading steering system.

Figure 14:
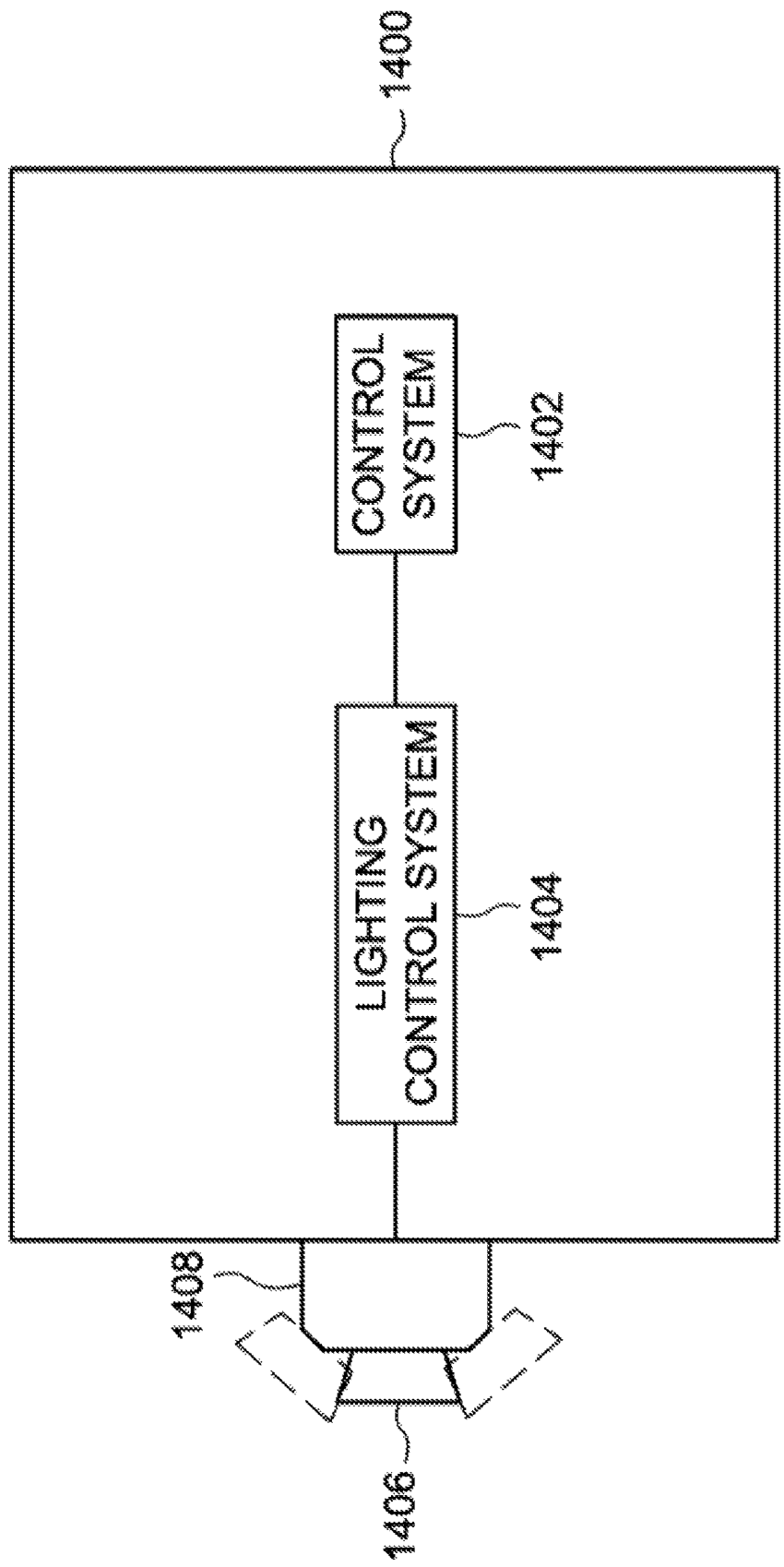
FIG. 14 is a top view of a vehicle according to one embodiment.

FIG. 14 is a top view of an embodiment of a vehicle 1400. The vehicle may represent one or more of the other vehicles described herein, or another vehicle. The vehicle includes a vehicle control system 1402 (such as one or more of the vehicle control systems described herein) and a lighting control system 1404. As described above, the vehicle control system control operations of the vehicle, including the determination or measurement of a curvature of the route being traveled by the vehicle. The lighting control system controls operations of a lighting device 1406 that generates light to illuminate the area in front of the vehicle along a direction of travel of the vehicle. For example, the lighting control system may or manually control the lighting device to emit light when ambient light may be relatively low or dark.

The lighting control system controls one or more actuators 1408 that may be coupled with the lighting device. The actuators may be similar to the actuators (shown in FIG. 11) in that the actuators may be controlled by the lighting control system to change an orientation of the lighting device. As shown in FIG. 14, the actuators may move (e.g., turn, pivot, rotate, or the like) the lighting device by turning the lighting device left or right relative to a direction of travel of the vehicle. The lighting device may be shown in FIG. 14 in dashed line in two example positions where the lighting device may be turned toward.

The control system may use the measured curvature of the route to direct the lighting control system to control the orientation of the lighting device so that the lighting device may be directed toward the route when the vehicle may be traveling on a curved segment of the route. For example, the control system may measure the curvature of the route (as described above) and report this curvature to the lighting control system. The lighting control system may determine how far to pivot or turn the lighting device to ensure that the lighting device may be oriented more toward the route (e.g., toward the center of the route) than away from the route in the curved segment of the route. For smaller radii of curvature in the route, the lighting control system may determine that the lighting device needs to be turned more to be oriented toward the route than for larger radii of the route. The lighting control system may direct the actuators to turn the lighting device accordingly such that the lighting device may be oriented in the same direction of travel as the vehicle along the curved segment of the route.

In accordance with one or more embodiments described herein, the off-board-based input speed and the onboard-based input speeds can be used to measure sizes (e.g., diameters) of the wheels of a vehicle. When used herein, wheels may include tires, tread, etc. in example embodiments where a tire, tread, etc. are used. For the purposes of this disclosure, when wheel size, diameter, etc. is discussed, for vehicles that use tires, treads, etc. the wheel includes the tire, tread, etc. as part of the measurement.

In one example, input speeds may be used to estimate or measure the diameters of wheels of a rail vehicle, wheels of an automobile, or wheels of another vehicle. With respect to rigid wheels (e.g., the non-inflatable wheels of a rail vehicle), the wheel sizes can be measured to monitor wear of the wheels and/or to calibrate the onboard-based input speeds (e.g., due to changes or errors in an input wheel size that may be used to determine the onboard-based input speeds). Accordingly, a diminishing wheel size relates to loss of material around the contacting peripheral edge of the wheel. In one embodiment, it is possible to calculate the rate of wear of the steel track based at least in part on the wear calculated for the wheel (which in turn is proportional to the wheel size) and optionally on the wheel material (a harder steel wheel will have a different effect on the rail track compared to a softer steel).

With respect to non-rigid wheels (e.g., wheels having inflatable tires on the wheels, such as on an automobile), the wheel sizes can be indicative of wear of the tires and/or air pressure of the tires. In one embodiment where the wheel is an inflated rubber wheel, the wheel size can be monitored and, if a decrease has been identified, then an automobile operator may be warned of decreasing tire pressure, an underinflated tire, an impending flat tire, and/or an actual flat tire. In one embodiment, the wheel size may refer to the diameter of the physical material of the wheel itself without consideration of air or tire pressure. For example, the wheel size may refer to the tread thickness and, assuming other factors are constant, the wheel size directly relates to the wear of the tire tread. Alternatively, the wheel size may refer the wheel material thickness and, assuming other factors are constant, the wheel size directly relates to the wear of the wheel material. For example, for a rail vehicle that does not include a tire and has a metal wheel, the diameter of the metal is predicted. Therefore, the wheel size may include a determination of the thickness of the wheel based on a predicted wear of the wheel during a trip. Specifically, as provided herein, the wheel size and wear may be determined, calculated, predicted, etc. using the methods and calculation described herein.

In one embodiment, a current wheel size may be calculated using a scale factor that may be applied to a static reference wheel size (such as the wheel size of a new wheel). Speed calculations can then use current wheel size and the wheel rotation counter or tachometer values. The current wheel size can be either placed in non-volatile memory for retrieval, as needed and updating as available; or, can be generated and use dynamically and in near real time to avoid having to store the wheel size value and then update the stored wheel size value.

Due to errors in the measurement of the reference wheel, wear on the reference wheel during a trip, or other factors, the measured diameter of the reference wheel may initially be inaccurate and/or may become inaccurate during a trip. As a result, the onboard-based input speed that may be calculated using the diameter of the reference wheel may be or become inaccurate.

Returning to the description of the vehicle system shown in FIG. 1, in one aspect, the control system uses the off-board-based input speeds determined from data signals received from off-board devices to calculate a reference wheel diameter for one or more wheels of the vehicle. The control system may obtain the wheel speeds at which the one or more wheels of the vehicle rotate. As described above, these wheel speeds may be measured by the speed sensors. The wheels speeds may be represented in terms of revolutions per unit time of the wheels.

The control system may calculate the reference wheel diameter using a relationship between the off-board-based input speed and the wheel speed of one or more of the wheels. For example, the control system may determine a reference wheel diameter using the following:

$$d = \frac{v_{OB} * r_G * C}{rpm} \quad \text{(Equation \#3)}$$

where d represents the reference wheel diameter, $v_{OB}$ represents the off-board-based input speed, rpm represents the speed at which the reference wheel rotates (e.g., revolutions of the wheel per minute, obtained from the speed sensors) and $r_G$ and C represent one or more variables and/or constant values based on one or more characteristics of the vehicle system. For example, $r_G$ may represent a gear ratio for gears used to couple a motor to the axle connected to the reference wheel and C may represent a factor having a designated value, such as 336.13. Optionally, C may have another value.

The control system may calculate the reference wheel diameter for several, or all, of the wheels in the vehicle. The reference wheel diameters may be used to calculate or calibrate the onboard-based input speeds of the wheels. In one aspect, the diameters of the wheels may be individually calibrated (e.g., modified) to match or be closer to the reference wheel diameter that may be calculated using the off-board-based input speed and the rotational speed of the respective wheel. Optionally, the diameters of a group of two or more wheels may be calibrated to match or be closer to the reference wheel diameter that may be calculated using the off-board-based input speed and the rotational speed of the respective wheel.

The reference wheel diameters may be periodically determined during a trip of the vehicle system using the off-board-based input speeds to re-calibrate the onboard-based input speeds. These onboard-based input speeds that may be re-calibrated may be used in connection with controlling the vehicle system according to a trip plan. For example, the control system may control operations of the vehicle system (or direct an operator to control the operations) so that the speed of the vehicle system (as determined from the onboard-based input speeds) matches or corresponds with the designated speeds of a trip plan for the vehicle system.

In one aspect of the inventive subject matter, the control system may compare the off-board-based input speed with the onboard-based input speed measured for a reference wheel or a reference axle. The reference wheel may represent the wheel for which an operator manually measured and/or input the size of the wheel into the control system for determining the onboard-based input speed. The reference axle may represent the axle to which the reference wheel may be joined.

If the off-board-based input speed differs from the onboard-based input speed for the reference wheel or reference axle (e.g., by at least a designated, non-zero threshold), then the control system may determine that this difference constitutes a relatively large error. The control system may notify the operator of the vehicle, such as by activating one or more lights and/or speakers, displaying a warning on an output device, or the like. In response, the operator may obtain another manual measurement of the size of the reference wheel. For example, the operator may stop movement of the vehicle system, disembark from the vehicle system, manually measure or re-measure the size of the reference wheel and input the size into the control system.

Optionally, the control system may scale or otherwise modify an input speed based on a difference between input speeds. If the off-board-based input speed differs from the onboard-based input speed, then the control system may scale the off-board-based input speeds (e.g., multiply the off-board-based input speeds by a correlation factor) to be closer to the onboard-based input speeds. For example, if the off-board-based input speeds may be 10% faster than the onboard-based input speeds, then the control system may divide future off-board-based input speeds by a factor of 1.1 (e.g., 110%) or multiply future off-board based input speeds by a factor of 0.9 (e.g., 90%). Or, if the off-board-based input speed differs from the onboard-based input speed, then the control system may scale the onboard-based input speeds to be closer to the off-board-based input speeds.

Calculation of the reference wheel diameter using the off-board-based input speeds may be used to check or monitor inflation of a tire on an automobile. The vehicle may represent an automobile and the wheels may represent inflated tires of the automobile. The control system may represent an onboard computer system (e.g., having one or more processors) that compares reference wheel diameters calculated for the tires using off-board-based input speeds, such as speeds derived from GPS data or other positional data. The control system may associate different reference wheel diameters with different amounts of inflation of the tires. When the off-board-based input speeds indicate that the diameter of a tire has changed, such as due to a loss in air pressure, then the control system may notify a driver of the automobile. Optionally, the control system may monitor changes in the diameter of the tires (as determined from the off-board-based input speeds) and notify the driver of the automobile of significant changes in the diameter, such as those changes that may indicate a leak in the tire, a flat tire, or the like. In one aspect, the control system may contact an off-board location, such as a repair facility or tow truck, responsive to determining that the tire pressure in one or more tires has reduced and/or indicates a flat or impending flat tire.

In one aspect of the subject matter described herein, the use of positional data (e.g., geographic locations, headings and the like) that may be obtained from an off-board source may be limited to the use of only headings and/or velocities. For example, the curvature of a route segment may be determined using only headings of the vehicle system obtained from an off-board source and not the coordinates of the vehicle system. As another example, the wheel diameter of a vehicle system may be determined using only the speed of the vehicle system and not the headings of the vehicle system, that may be obtained from an off-board source.

The systems and methods described herein may use the positional data regardless of how fast or slow the vehicle system may be traveling. For example, the systems and methods described herein may not place a lower limit on the speed of the vehicle system, where travel at speeds below this limit prevent the calculation of reference speeds, wheel diameters, route curvatures and the like. Similarly, the systems and methods described herein may not place an upper limit on the speed of the vehicle system, where travel at speeds faster than this limit prevent the calculation of reference speeds, wheel diameters, route curvatures and the like. While one or more filters or adjustments may be made to the positional data, reference speeds, wheel diameters, route curvatures and the like, may be made based on the moving speed of the vehicle system, the systems and methods described herein may continue to obtain positional data and calculate the reference speeds, wheel diameters, route curvatures and the like, using that data, regardless of how fast or slow the vehicle system may be moving when the positional data may be acquired.

Additionally, the systems and methods described herein may use the positional data regardless of how fast or slow the vehicle system may be accelerating. For example, the systems and methods described herein may not place a lower limit and/or an upper limit on the acceleration of the vehicle system, where changes in speeds below and/or above these limits, as appropriate, prevent the calculation of reference speeds, wheel diameters, route curvatures and the like. The systems and methods described herein may continue to obtain positional data and calculate the reference speeds, wheel diameters, route curvatures and the like, using that data, regardless of fast or slow the vehicle system may be changing speeds (e.g., accelerating or decelerating) when the positional data may be acquired.

Figure 15:
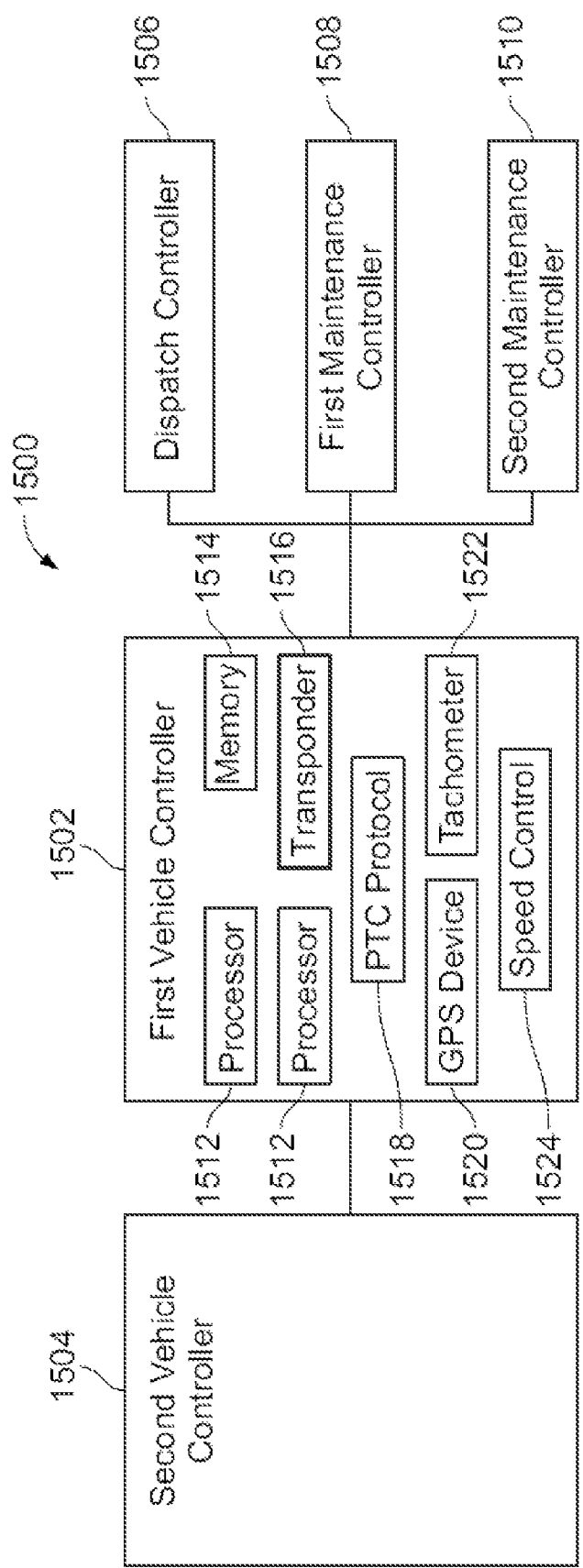
FIG. 15 is a schematic diagram of a communication network according to one embodiment.

FIG. 15 illustrate a schematic of a communication network 1500 that includes a first vehicle controller 1502 and a second vehicle controller 1504. In one example the first vehicle controller may be the vehicle controller of FIG. 2. The first vehicle controller may be in communication with the second vehicle controller, an off-board dispatch controller 1506, a first off-board maintenance controller 1508 and a second off-board maintenance controller 1510. Similarly, the second vehicle controller may also be in communication with the off-board dispatch controller, the first off-board maintenance controller and the second off-board maintenance controller. The off-board dispatch controller, first off-board maintenance controller and second off-board maintenance controller may all also be in communication with one another. Each controller may be in communication with the other controllers in manners previously described herein.

The first vehicle controller includes one or more processors 1512, at least one memory 1514, a transponder 1516 that may be a separate broadcasting device and receiver and a PTC protocol 1518. The first vehicle controller also includes a GPS device 1520, tachometer 1522 and speed control 1524, all electrically coupled to the one or more processors. Each of the GPS device, tachometer and speed control are positioned to detect information related to the vehicle, including information associated with wheels of the first vehicle system. The GPS device, tachometer and speed control may detect and obtain information in any manner previously described herein.

The one or more processors of the first vehicle controller may include a look-up table, mathematical function, algorithm, etc. to determine the diameter of the wheel. If the wheel may be below a first threshold size, a message may be sent to any one of the second vehicle controller, off-board command controller, first off-board maintenance controller, or second off-board maintenance controller. The message may provide information associated with the wheel, including wheel size, need for changing, wheel type or model, and the like. In one example, the first threshold size may be the only threshold size determined by the one or more processors and additional threshold sizes, including a second threshold size is not determined. Instead, upon reaching the first threshold size, the one or more processors alert the operator and/or sends messages to cause the first vehicle to stop and the next location available for replacing the wheel. Alternatively, in addition to the first threshold size, a second threshold size and third threshold size are provided. With each size being reached, different corresponding messages may be sent to different locations.

In one example, upon a determination that the diameter of the wheel may be below a first threshold size or may be predicted to be below a first threshold size by the time the vehicle reaches a stop, the first vehicle controller may send a signal to the first off-board maintenance controller that the wheel needs to be replaced. In particular, the first threshold size may be a predetermined diameter off the wheel that represent a diameter when replacement of a wheel may be desired, but not required. For example, for a 36 inch diameter wheel, 34 inches may be a first threshold size that causes an operator to be alerted the wheel should be replaced. In contrast, the wheel may also include a second threshold size, wherein the vehicle system must make the next available stop to replace the wheel. In the example of the 36 inch diameter wheel, the second threshold size may be 30 inches. When the second threshold size may be reached, the one or more processors may send a message to off-board command center as well as a first off-board maintenance controller that the wheel needs to be replaced. As a result, if an operator may be ignoring a request for maintenance, the command center may be notified to ensure the vehicle stops at the next maintenance location for maintenance. When received by an off-board command center, an individual may radio the vehicle operator, or may schedule maintenance to change the wheel at the next stop.

In another example, the one or more processors of the first vehicle controller predict the diameter of the wheel at a first stop and at a second stop. If the diameter of the wheel will be between a first threshold size and a second threshold size at both the first stop and second stop, the one or more processors may send a signal to request information from the first off-board maintenance device and the second off-board maintenance device. In particular, the second off-board maintenance device may be further away than the first off-board maintenance device. Then, if a first off-board maintenance device indicates the replacement wheel and a desired time slot are not available and delays may occur, while the second off-board maintenance device indicates the wheel and a desired time slot may be available, the first vehicle controller sends a signal to schedule a maintenance appointment at the second stop. An alert may also be sent to the operator to not stop at the first off-board maintenance location for maintenance.

In another example, the one or more processors may also use information from the trip characterization element (FIG. 2) to determine messages to send to off-board maintenance devices. In one example, a vehicle may be scheduled to make a stop at a first off-board maintenance location to refuel according to a trip plan. The one or more processors may determine the diameter of the wheel will be above the first threshold size at the first off-board maintenance location, but between the first threshold size and second threshold size at a second off-board maintenance location. Because of the scheduled stop at the first off-board maintenance location, the one or more processors may send a message to the first off-board maintenance device to schedule maintenance for replacement of the wheel, even though the wheel may be predicted to be above the first threshold size at the first off-board maintenance location. This prevents an additional stop during the trip caused by the need for additional maintenance.

Figure 16:
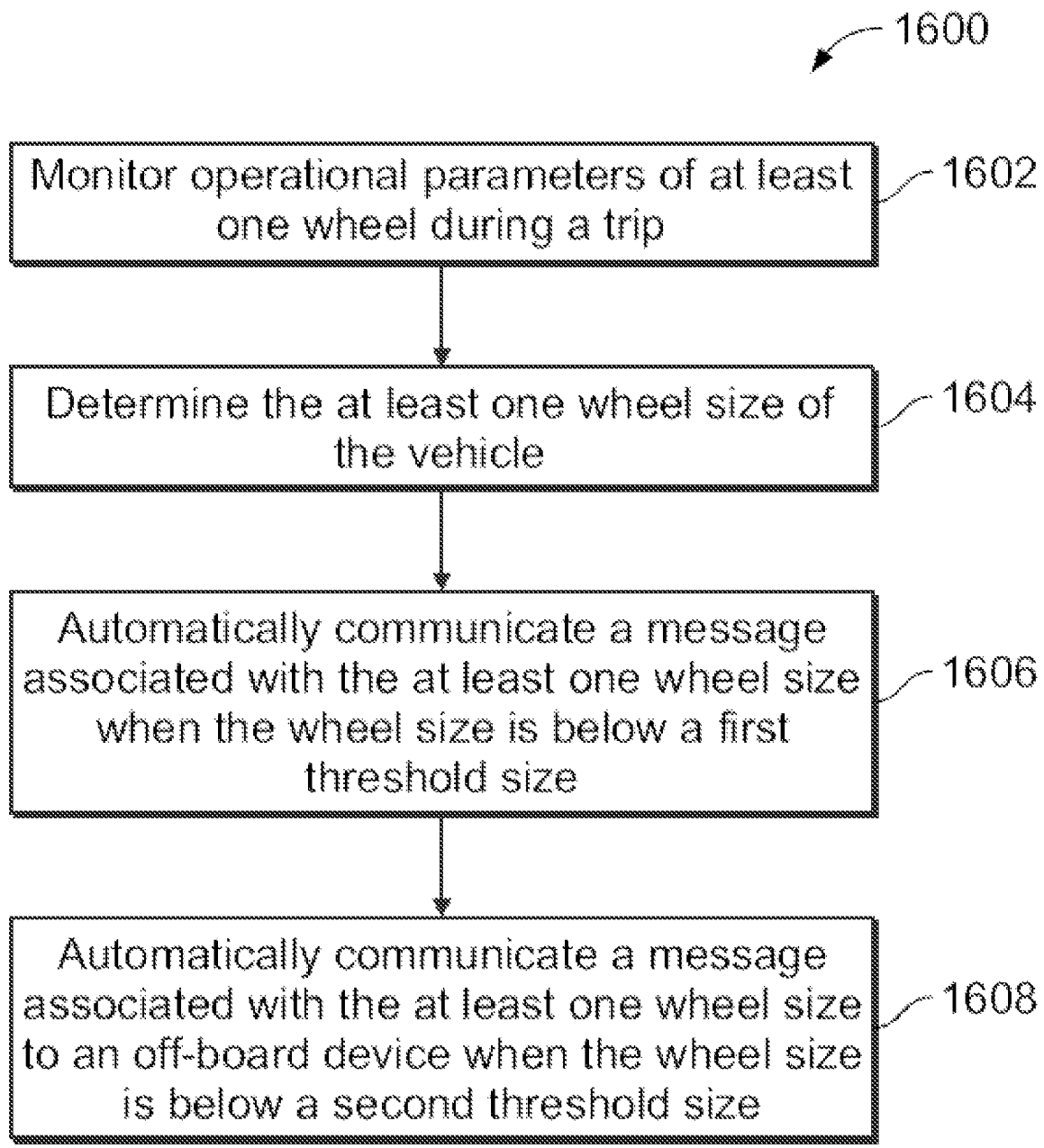
FIG. 16 is a flowchart of a method for scheduling maintenance according to one embodiment

FIG. 16 is a method 1600 for scheduling maintenance for a wheel of a vehicle. In one example, the vehicle may be part of the vehicle system of FIG. 1. A suitable vehicle may be an automobile, aircraft, mining vehicle, agricultural vehicle, or other off-highway vehicle (OHV) (e.g., a vehicle that may be not legally permitted and/or designed for travel on public roadways), and the like. The vehicle may include a controller that has a PTC protocol for operating within a larger vehicle system with other vehicles that travel the same or similar routes.

At 1602, one or more processors monitor operational parameters of at least one wheel during a trip. Operational parameters may include initial wheel size, global positioning system distance from a beginning of the trip, wheel rotation count during the trip, wheel tachometer readings during the trip, etc. The one or more processors may monitor the operational parameters through use of one or more sensors, including a GPS, tachometer, compass, or the like that sends data signals to the one or more processors. Additionally, the one or more processors may monitor the operational parameters by comparing information received from the data signals to information received from a memory or input into the one or more processors. This information received from the memory or input may include starting location coordinates for the trip, initial wheel size at the start of the trip, initial tachometer reading at beginning of the trip, amount of time or age of a wheel, wheel material, wheel specifications from a manufacturer, trip plan, expected weather conditions during trip, trip plans of other vehicles along a route, etc. The one or more processors may use a look-up table, algorithm, or the like to monitor the operational parameters.

At 1604, the one or more processors determine the wheel size of the vehicle based on at least one of the operational parameters monitored. In one example, the one or more processors use a look-up table, comparing one or more operational parameter monitored within historical data associated with the operational parameter to make the determination. For example, the historical data may be a tachometer reading and a GPS location that have a wheel size associated with the tachometer reading and GPS location. The monitored data may be the tachometer reading and GPS location of the vehicle on the trip. Therefore, the wheel size provided in the look-up table may be the determined wheel size. In particular, for vehicles that follow the same route, such as rail vehicles, where that route may have curves, hills and similar terrain, the look-up table may be used.

In another example, to determine the wheel size, one or more of the operational parameters monitored may be put into an equation, or algorithm to calculate the wheel size. Additionally, an artificial intelligence (AI) algorithm may be used to determine the wheel size. In particular, numerous variables, including weather conditions during a trip, route terrain, etc. are inputted into an algorithm to determine the wheel size. When the wheel is replaced, the wheel size may be measured for the actual size of the wheel at the time of wheel replacement. Based on the actual measurement, weight associated with the different variables may be constantly updated and changed to ensure an increase the accuracy of the wheel size determination.

While the one or more processors may determine the wheel size through calculations, look-up tables, etc., in other examples the wheel size may be determined by receiving a communication that includes the wheel size. In particular, in some examples, the one or more processor may send the operational parameters monitored to an off-board device. The off-board device may make the determination, including calculation of the wheel size of the vehicle and send a signal to the one or more processors that includes the wheel size. In particular, an off-board computer may have additional information related to other vehicles, weather conditions, or the like, that the one or more processors may not have available. As a result, the off-board device may make the necessary determinations and send the information to the one or more processors for use. By receiving the communication from the off-board device and recognizing the communication may be associated with the wheel size, the one or more processors may determine the wheel size of the vehicle during the trip.

At 1606, a message associated with the wheel size may be communicated to an off-board device when the wheel size is below a first threshold size. The message associated with the wheel size may be commanded to be sent by the one or more processors, or another off-board device that makes the determination of the wheel size. The message may be an electronic message, email, text, automated phone call, instant text message, selected based on application specific parameters. The message may be assumed or considered sent, because once a wheel is determined to be below the first threshold size, the message is sent without the input of an operator.

The off-board device may be a device associated with maintenance personnel. As an example, at a train depot, maintenance staff may be on call to service rail vehicles that come into the train depot. The maintenance staff may have a computing device that includes a scheduling program of all maintenance that occurs at the depot, including the service to be performed, the parts needed for the service and the personnel responsible for the service. The scheduling program may also have access to inventory for parts, including wheels available at the depot. The scheduling program may also communicate with secondary off-board device, including cell phones, smart phones, ipads, etc. to alert a worker the service may be requested. In this manner, when a determination may be made that service may be needed, such as a wheel change, the one or more processors may communicate with the off-board device to determine availability of parts and maintenance time, along alerting maintenance personal of an upcoming service. So, instead of a rail vehicle pulling into the depot and the wheel size of each wheel being manually measured and then retrieving parts and scheduling a time for maintenance; the one or more processors schedules the maintenance while the rail vehicle may be in route, reducing the maintenance time to change the wheel once the rail vehicle reaches the depot.

Alternatively, the off-board device may be a device associated with a command center or dispatch. Specifically, the device at the dispatch may receive messages from plural vehicles. By receiving the messages of plural vehicles, the dispatch may make determinations related to the most favorable location for the vehicle to stop. As an example, the vehicle may send the message that the size of a wheel is between a first threshold size and a second threshold size and that a second train also has a wheel that may be between a first threshold size and a second threshold size. The dispatch device may send a signal to request more information, or alternatively predict how far each rail vehicle may travel before the wheel size of each rail vehicle drops below a second threshold size. Then based on these determinations, the dispatch may send a signal used by the one or more processors to determine a depot at which to make a stop. Additionally, by providing the wheel diameter information with a dispatch device, the information associated with plural rail vehicles may be collected and used for future determinations for other rail vehicles.

At 1608, a message associated with the wheel size may be communicated to an off-board device when the wheel size is below a second threshold size. The message sent may be the same type of message or sent in the same manner as described in relation to the message at 1606. In one example, when the wheel size is determined to be below the first threshold size, but not below the second threshold size, the operator may be alerted and the message may be sent to a first off-board device associated with a maintenance station at a rail depot. When the wheel size is determined to be below the second threshold size, the message may be sent to a second off-board device associated with a dispatcher at a dispatch device that is monitoring other vehicles. In this manner, an individual may contact the operator to determine why the wheel has not been previously replaced and to ensure the operator has the wheel replaced at the next available stop. This ensures that if the operator does not receive the alert associated with the wheel diameter falling below the first threshold size and/or second threshold size, that another individual is alerted.

In one or more embodiments, a system may be provided that may include a controller with one or more processors configured to determine the wheel size of a wheel of a vehicle during a trip and communicate a message associated with the wheel size to an off-board device when the wheel size is below a threshold size.

Optionally, the one or more processors may be configured to monitor one or more operational parameters of at least one wheel of the vehicle during the trip and calculate the wheel size based on the one or more operational parameters. In another aspect, the one or more operational parameters may include at least one of initial wheel size, a distance from a beginning of the trip, or wheel tachometer readings during the trip. Alternatively, the one or more operational parameters may include, a distance from a beginning of the trip and a speed from the beginning of the trip.

Optionally, the one or more processors may be configured to communicate the message associated with the wheel size to an off-board dispatch system. In another aspect, the one or more processors may be configured to communicate with the off-board device to schedule a time for maintenance for the at least one wheel based on the wheel size determined.

In one or more embodiment, a method may be provided that may include determining the wheel size of a vehicle during a trip and determining if the wheel size is below a first threshold size. The method may also include communicating a first message associated with the wheel size to a first off-board device when the wheel size is below the first threshold size.

Optionally, the method may also include monitoring operational parameters of the at least one wheel during the trip and calculating the wheel size based on the operational parameters to determine the wheel size of the vehicle during the trip. In another aspect, the operational parameters may include at least one of initial wheel size, global positioning system distance from a beginning of the trip, wheel rotation count during the trip, or wheel tachometer readings during the trip. Optionally, the method may also include determining if the wheel size is below a second threshold size and communicating a second message associated with the wheel size to a second off-board device when the wheel size is below the second threshold size. In one example, the first off-board device may be at a location for maintenance and the second off-board device is a dispatch device.

Optionally, the method may also include predicting distance to be traveled by the vehicle before reaching a second threshold size after the wheel size is determined to be below the first threshold size. In another aspect, the method may include determining a location for maintenance based on the distance to be traveled predicted. Optionally, the method may also include sending a signal to schedule a time for maintenance for the at least one wheel based on the distance to be traveled predicted. In one or more embodiments, a system may be provided that may include a vehicle and at least one sensor on-board the vehicle that determines at least one operational parameter of the vehicle. The system may also include a controller on-board the vehicle and in communication with the at least one sensor. The controller may include one or more processors configured to determine the wheel size of the vehicle during a trip based on the at least one operational parameter determined and communicate a first message associated with the wheel size to a location for maintenance when the wheel size reaches a first threshold size.

Optionally, the one or more processors may be configured to calculate the wheel size based on the at least one operational parameter to determine the wheel size of the vehicle during the trip. In another aspect, the one or more processors may be configured to determine if the wheel size is below a second threshold size and communicate a second message associated with the wheel size to an off-board device when the wheel size is below the second threshold size. Optionally, the second threshold size may be less than the first threshold size. In another aspect, the off-board device may be at a dispatch device. In one example, the at least one sensor may be a global positioning system, or tachometer.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array and application specific integrated circuit and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media and removable and non-removable media such as firmware, physical and virtual storage, CD-ROMS, DVDs and other digital sources, such as a network or the Internet.

The singular forms "a", "an" and "the" include plural references unless the context clearly dictates otherwise. "Optional" or "optionally" means that the subsequently described event or circumstance may or may not occur and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode and to enable a person of ordinary skill in the art to practice the embodiments, including making and using any devices or systems and performing any incorporated methods. The claims define the patentable scope of the disclosure and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system for a vehicle including an axle connected to wheels, wherein the axle is rotatable by a propulsion subsystem to propel the vehicle along a route, wherein the wheels are rotatable by the axle to propel the vehicle along the route, the system comprising:
    a controller including one or more processors configured to:
        determine a wheel size of at least one of the wheels of the vehicle during a trip;
        communicate a message associated with the wheel size to an off-board device when the wheel size is below a threshold size; and
        control the axle based on an off-board-based input speed, an onboard-based input speed, and the wheel size being below the threshold size.

2. The system of claim 1, further comprising one or more sensors configured to sense or measure or monitor one or more operational parameters of the vehicle during the trip.

3. The system of claim 2, wherein the controller is configured to determine the wheel size based at least in part on the one or more operational parameters.

4. The system of claim 2, wherein the operational parameters include one or more of an initial wheel size, a wheel rotation count during the trip, a tachometer reading during the trip, a calculated distance traveled during the trip, and a terrain profile of a portion of a route already travelled by the vehicle during the trip.

5. The system of claim 2, wherein the one or more operational parameters include a top speed, an average speed, a braking rate, and a braking frequency during the trip.

6. The system of claim 1, wherein the off-board device is configured to communicate the message associated with the wheel size to a dispatch center.

7. The system of claim 1, wherein the off-board device is configured to communicate with a maintenance scheduling system and thereby to schedule a time, a location, or a time and location for maintenance of the at least one of the wheels based at least in part on the determined wheel size.

8. The system of claim 1, wherein the controller is further configured to determine respective wheel sizes of the wheels of the vehicle during operation of the vehicle.

9. The system of claim 1, wherein the wheel size determined by the controller includes a thickness of the material forming the at least one of the wheels based on a predicted wear of the at least one of the wheels during the trip.

10. A method for a vehicle including an axle connected to wheels, wherein the axle is rotatable by a propulsion subsystem to propel the vehicle along a route, wherein the wheels are rotatable by the axle to propel the vehicle along the route, the method comprising:
    calculating, by a controller including one or more processors, a wheel size of at least one of the wheels of the vehicle during operation of the vehicle during a trip;
    determining, by the controller, if the wheel size is below a first threshold size;
    communicating, by the controller, a first message associated with the wheel size to a first off-board device in response to the wheel size being calculated to be below the first threshold size; and
    controlling, by the controller, the axle based on an off-board-based input speed, an onboard-based input speed, and the wheel size being below the threshold size.

11. The method of claim 10, further comprising:
    determining if the wheel size is below a second threshold size; and
    communicating a second message associated with the wheel size to a second off-board device when the wheel size is below the second threshold size, wherein the first off-board device communicates with a dispatch center and the second off-board device communicates with a maintenance scheduling system.

12. The method of claim 10, further comprising calculating, after the wheel size reaches the first threshold size, a distance to be traveled by the vehicle until the wheel size of the at least one of the wheels will reach a smaller second threshold size.

13. The method of claim 12, further comprising sending a signal to schedule maintenance for the vehicle based at least in part on the calculated distance to be traveled before the wheel size reaches the second threshold size.

14. The method of claim 10, wherein the calculating is based at least in part on one or more measured operational parameters.

15. The method of claim 14, wherein the operational parameters comprise one or more of an initial wheel size, a wheel rotation count during the trip, a tachometer reading during the trip, a calculated distance traveled during the trip, and a terrain profile of a portion of a route already travelled by the vehicle during the trip.

16. A system for a vehicle including an axle connected to wheels, wherein the axle is rotatable by a propulsion subsystem to propel the vehicle along a route, wherein the wheels are rotatable by the axle to propel the vehicle along the route, the system comprising:
    at least one sensor on-board the vehicle configured to sense at least one operational parameter of the vehicle;
    one or more processors on-board the vehicle and in communication with the at least one sensor being configured to:
        determine a wheel size of at least one of the wheels of the vehicle while the vehicle is operating based at least in part on the at least one operational parameter;
        communicate a first message relating to the wheel size when the wheel size reaches a first threshold size; and control the axle based on an off-board-based input speed, an onboard-based input speed, and the wheel size being below the first threshold size or a second threshold size that is a smaller size than the first threshold size.

17. The system of claim 16, wherein the one or more processors are configured to determine the wheel size based at least in part on the at least one operational parameter during execution of a trip plan by the vehicle.

18. The system of claim 16, wherein the one or more processors are further configured to:
   determine if the wheel size is below the second threshold size; and
   communicate a second message associated with the wheel size to an off-board device when the wheel size is below the second threshold size.

19. The system of claim 18, wherein the at least one sensor comprises at least one of a global positioning system or a tachometer.

20. The system of claim 18, wherein the one or more processors are configured to receive a route for the vehicle that is selected by a dispatch center based at least in part on the first message, the second message, or both the first and second messages.

* * * * *